United States Patent
Ishizawa et al.

(10) Patent No.: US 8,250,205 B2
(45) Date of Patent: Aug. 21, 2012

(54) BUSINESS PROCESS MANAGEMENT SYSTEM, METHOD THEREOF, PROCESS MANAGEMENT COMPUTER AND PROGRAM THEREOF

(75) Inventors: Takashi Ishizawa, Fujisawa (JP); Atsushi Hatakeyama, Yokohama (JP); Naotsugu Toume, Yokohama (JP); Ryo Kawai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1174 days.

(21) Appl. No.: 12/027,691

(22) Filed: Feb. 7, 2008

(65) Prior Publication Data

US 2009/0031321 A1 Jan. 29, 2009

(30) Foreign Application Priority Data

Jul. 23, 2007 (JP) ................................. 2007-191151

(51) Int. Cl.
*G06F 15/173* (2006.01)
(52) U.S. Cl. .................. 709/224; 709/222; 718/105
(58) Field of Classification Search .................. 709/222, 709/224; 718/104
See application file for complete search history.

(56) References Cited

U.S. PATENT DOCUMENTS

| | | | |
|---|---|---|---|
| 6,665,716 B1 | 12/2003 | Hirata et al. | |
| 7,565,656 B2 | 7/2009 | Yamasaki et al. | |
| 7,568,028 B2 * | 7/2009 | Horikawa | 709/224 |
| 7,752,629 B2 * | 7/2010 | Revanuru et al. | 718/105 |
| 7,986,625 B2 * | 7/2011 | Chase et al. | 370/231 |
| 2003/0069972 A1 | 4/2003 | Yoshimura et al. | |
| 2004/0109410 A1 * | 6/2004 | Chase et al. | 370/229 |
| 2005/0102674 A1 | 5/2005 | Tameshige et al. | |
| 2005/0262237 A1 * | 11/2005 | Fulton et al. | 709/224 |
| 2007/0250608 A1 * | 10/2007 | Watt | 709/222 |

FOREIGN PATENT DOCUMENTS

| | | |
|---|---|---|
| JP | 2000-231502 | 8/2000 |
| JP | 2003-124976 | 4/2003 |
| JP | 2005-141605 | 6/2005 |
| JP | 2007-048315 | 2/2007 |

\* cited by examiner

*Primary Examiner* — Diem Cao

(74) *Attorney, Agent, or Firm* — Foley & Lardner LLP

(57) ABSTRACT

A business process management computer, when the load of a service execution computer etc. is increased, determines the condition of a service call step which is calling a service execution unit, etc. of said service execution computer, etc. If said condition is the bottleneck condition, it determines the condition of the service call step in other process which is calling said service execution unit, etc. If there is no condition other than the bottleneck in that condition, the addition of the resource for said service execution computer, etc. is determined and if there is a condition in which the throughput can be limited, it is determined that the throughput should be limited. In a process which is configured with a plurality of service call steps, when the resource insufficiency has occurred, a means to make the adequate addition of the resource possible can be provided.

16 Claims, 26 Drawing Sheets

1221 SERVICE CALL STEP MANAGEMENT TABLE

| BUSINESS PROCESS NAME (5100) | CALLING SERVICE NAME (5200) | CALLING ORDER (5300) | THROUGHPUT (5400) | STEP CONDITION (5500) |
|---|---|---|---|---|
| BP_A | A | 1 | 25 CALLINGS / min | FLOWING DATA AMOUNT LIMITATION AVAILABLE |
| BP_A | B | 2 | 20 CALLINGS / min | FLOWING DATA AMOUNT LIMITATION AVAILABLE |
| BP_A | C | 3 | 20 CALLINGS / min | FLOWING DATA AMOUNT LIMITATION AVAILABLE |
| BP_A | D | 4 | 10 CALLINGS / min | BOTTLENECK |
| BP_A | E | 5 | 10 CALLINGS / min | NORMAL |
| BP_B | F | 1 | 20 CALLINGS / min | FLOWING DATA AMOUNT LIMITATION AVAILABLE |
| BP_B | B | 2 | 15 CALLINGS / min | BOTTLENECK |
| BP_B | G | 3 | 15 CALLINGS / min | NORMAL |
| BP_B | H | 4 | 15 CALLINGS / min | NORMAL |

FIG.4

1421 RESOURCE MANAGEMENT TABLE

| RESOURCE NAME | AVERAGE CPU UTILIZATION | LOAD CONDITION |
|---|---|---|
| SERVER 1 | 50% | NORMAL |
| SERVER 2 | 80% | OVERLOAD |
| SERVER 3 | 50% | NORMAL |
| SERVER 4 | 50% | NORMAL |
| SERVER 5 | 50% | NORMAL |
| SERVER 6 | 50% | NORMAL |
| SERVER 7 | 50% | NORMAL |
| SERVER 8 | 50% | NORMAL |

1321 SERVICE MANAGEMENT TABLE

| SERVICE NAME (4100) | RESOURCE NAME (4200) |
|---|---|
| A | SERVER 1 |
| B | SERVER 2 |
| C | SERVER 3 |
| D | SERVER 4 |
| E | SERVER 5 |
| F | SERVER 6 |
| G | SERVER 7 |
| H | SERVER 8 |

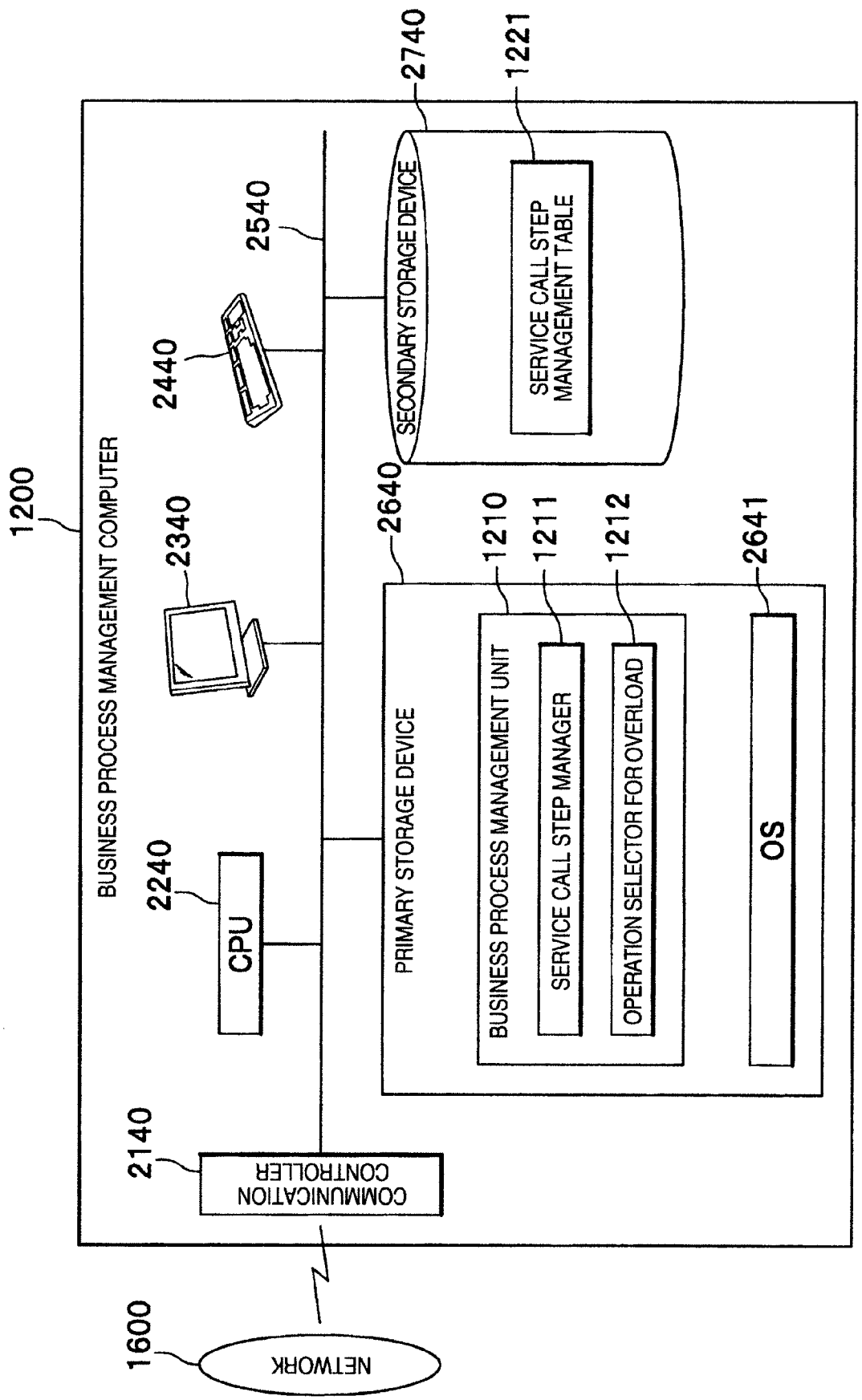

FIG.9

1221 SERVICE CALL STEP MANAGEMENT TABLE

| BUSINESS PROCESS NAME | CALLING SERVICE NAME | CALLING ORDER | THROUGHPUT | STEP CONDITION |
|---|---|---|---|---|
| BP_A | A | 1 | 25 CALLINGS / min | FLOWING DATA AMOUNT LIMITATION AVAILABLE |
| BP_A | B | 2 | 20 CALLINGS / min | FLOWING DATA AMOUNT LIMITATION AVAILABLE |
| BP_A | C | 3 | 20 CALLINGS / min | FLOWING DATA AMOUNT LIMITATION AVAILABLE |
| BP_A | D | 4 | 10 CALLINGS / min | BOTTLENECK |
| BP_A | E | 5 | 10 CALLINGS / min | NORMAL |
| BP_B | F | 1 | 20 CALLINGS / min | FLOWING DATA AMOUNT LIMITATION AVAILABLE |
| BP_B | B | 2 | 15 CALLINGS / min | BOTTLENECK |
| BP_B | G | 3 | 15 CALLINGS / min | NORMAL |
| BP_B | H | 4 | 15 CALLINGS / min | NORMAL |

BUSINESS PROCESS EXECUTION CONDITION DISPLAY SCREEN

| BUSINESS PROCESS NAME | CALLING SERVICE NAME | CALLING ORDER | THROUGHPUT | STEP CONDITION |
|---|---|---|---|---|
| BP_A | A | 1 | 25 CALLINGS / min | FLOWING DATA AMOUNT LIMITATION AVAILABLE |
| BP_A | B | 2 | 20 CALLINGS / min | FLOWING DATA AMOUNT LIMITATION AVAILABLE |
| BP_A | C | 3 | 20 CALLINGS / min | FLOWING DATA AMOUNT LIMITATION AVAILABLE |
| BP_A | D | 4 | 10 CALLINGS / min | BOTTLENECK |
| BP_A | E | 5 | 10 CALLINGS / min | NORMAL |
| BP_B | F | 1 | 20 CALLINGS / min | FLOWING DATA AMOUNT LIMITATION AVAILABLE |
| BP_B | B | 2 | 15 CALLINGS / min | BOTTLENECK |
| BP_B | G | 3 | 15 CALLINGS / min | NORMAL |
| BP_B | H | 4 | 15 CALLINGS / min | NORMAL |

FIG.15

1421 RESOURCE MANAGEMENT TABLE

| RESOURCE NAME | AVERAGE CPU UTILIZATION | LOAD CONDITION |
|---|---|---|
| SERVER 1 | 50% | NORMAL |
| SERVER 2 | 80% | OVERLOAD |
| SERVER 3 | 50% | NORMAL |
| SERVER 4 | 85% | OVERLOAD |
| SERVER 5 | 50% | NORMAL |

1321 SERVICE MANAGEMENT TABLE

| SERVICE NAME | RESOURCE NAME |
|---|---|
| ORDER ACCEPTANCE | SERVER 1 |
| STOCK INQUIRY | SERVER 2 |
| SHIPPING CONFIRM | SERVER 3 |
| SETTLEMENT | SERVER 4 |
| SHIPPING | SERVER 5 |

1221 SERVICE CALL STEP MANAGEMENT TABLE

| BUSINESS PROCESS NAME | CALLING SERVICE NAME | CALLING ORDER | THROUGHPUT | STEP CONDITION |
|---|---|---|---|---|
| ORDER PROCESSING | ORDER ACCEPTANCE | 1 | 25 CALLINGS / min | FLOWING DATA AMOUNT LIMITATION AVAILABLE |
| ORDER PROCESSING | STOCK INQUIRY | 2 | 20 CALLINGS / min | FLOWING DATA AMOUNT LIMITATION AVAILABLE — 1701 |
| ORDER PROCESSING | SHIPPING CONFIRM | 3 | 20 CALLINGS / min | FLOWING DATA AMOUNT LIMITATION AVAILABLE — 1702 |
| ORDER PROCESSING | SETTLEMENT | 4 | 10 CALLINGS / min | BOTTLENECK |
| ORDER PROCESSING | SHIPPING | 5 | 10 CALLINGS / min | NORMAL |

1321 SERVICE MANAGEMENT TABLE

| SERVICE NAME (4100) | RESOURCE NAME (4200) |
|---|---|
| ORDER ACCEPTANCE | SERVER 1 |
| STOCK INQUIRY | SERVER 2 |
| SHIPPING CONFIRM | SERVER 3 |
| SETTLEMENT | SERVER 4 |
| SHIPPING | SERVER 5 |
| REQUEST ACCEPTANCE | SERVER 6 |
| STOCK TOTAL | SERVER 7 |
| RESULT REPORT | SERVER 8 |

1221 SERVICE CALL STEP MANAGEMENT TABLE

| BUSINESS PROCESS NAME | CALLING SERVICE NAME | CALLING ORDER | THROUGHPUT | STEP CONDITION |
|---|---|---|---|---|
| ORDER PROCESSING | ORDER ACCEPTANCE | 1 | 25 CALLINGS / min | FLOWING DATA AMOUNT LIMITATION AVAILABLE |
| ORDER PROCESSING | STOCK INQUIRY | 2 | 20 CALLINGS / min | FLOWING DATA AMOUNT LIMITATION AVAILABLE |
| ORDER PROCESSING | SHIPPING CONFIRM | 3 | 20 CALLINGS / min | FLOWING DATA AMOUNT LIMITATION AVAILABLE |
| ORDER PROCESSING | SETTLEMENT | 4 | 10 CALLINGS / min | BOTTLENECK |
| ORDER PROCESSING | SHIPPING | 5 | 10 CALLINGS / min | NORMAL |
| STOCK TOTAL | REQUEST ACCEPTANCE | 1 | 20 CALLINGS / min | FLOWING DATA AMOUNT LIMITATION AVAILABLE |
| STOCK TOTAL | STOCK INQUIRY | 2 | 15 CALLINGS / min | BOTTLENECK |
| STOCK TOTAL | STOCK TOTAL | 3 | 15 CALLINGS / min | NORMAL |
| STOCK TOTAL | RESULT REPORT | 4 | 15 CALLINGS / min | NORMAL |

1221 SERVICE CALL STEP MANAGEMENT TABLE

| BUSINESS PROCESS NAME | CALLING SERVICE NAME | CALLING ORDER | THROUGHPUT | STEP CONDITION | |
|---|---|---|---|---|---|
| BP_A | A | 1 | 25 CALLINGS / min | NORMAL | 10001 |
| BP_A | B | 2 | 20 CALLINGS / min | NORMAL | 10002 |
| BP_A | C | 3 | 20 CALLINGS / min | NORMAL | 10003 |
| BP_A | D | 4 | 10 CALLINGS / min | BOTTLENECK | 10004 |
| BP_A | E | 5 | 10 CALLINGS / min | NORMAL | 10005 |

1221 SERVICE CALL STEP MANAGEMENT TABLE

| BUSINESS PROCESS NAME | CALLING SERVICE NAME | CALLING ORDER | THROUGHPUT | STEP CONDITION | IN FLOWING DATA AMOUNT LIMITATION FLAG |
|---|---|---|---|---|---|
| BP_A | A | 1 | 25 CALLINGS / min | FLOWING DATA AMOUNT LIMITATION AVAILABLE | OFF |
| BP_A | B | 2 | 20 CALLINGS / min | FLOWING DATA AMOUNT LIMITATION AVAILABLE | ON |
| BP_A | C | 3 | 20 CALLINGS / min | FLOWING DATA AMOUNT LIMITATION AVAILABLE | OFF |
| BP_A | D | 4 | 10 CALLINGS / min | BOTTLENECK | OFF |
| BP_A | E | 5 | 10 CALLINGS / min | NORMAL | OFF |
| BP_B | F | 1 | 20 CALLINGS / min | FLOWING DATA AMOUNT LIMITATION AVAILABLE | OFF |
| BP_B | B | 2 | 15 CALLINGS / min | BOTTLENECK | ON |
| BP_B | G | 3 | 15 CALLINGS / min | NORMAL | OFF |
| BP_B | H | 4 | 15 CALLINGS / min | NORMAL | OFF |

5100  5200  5300  5400  5500  26100

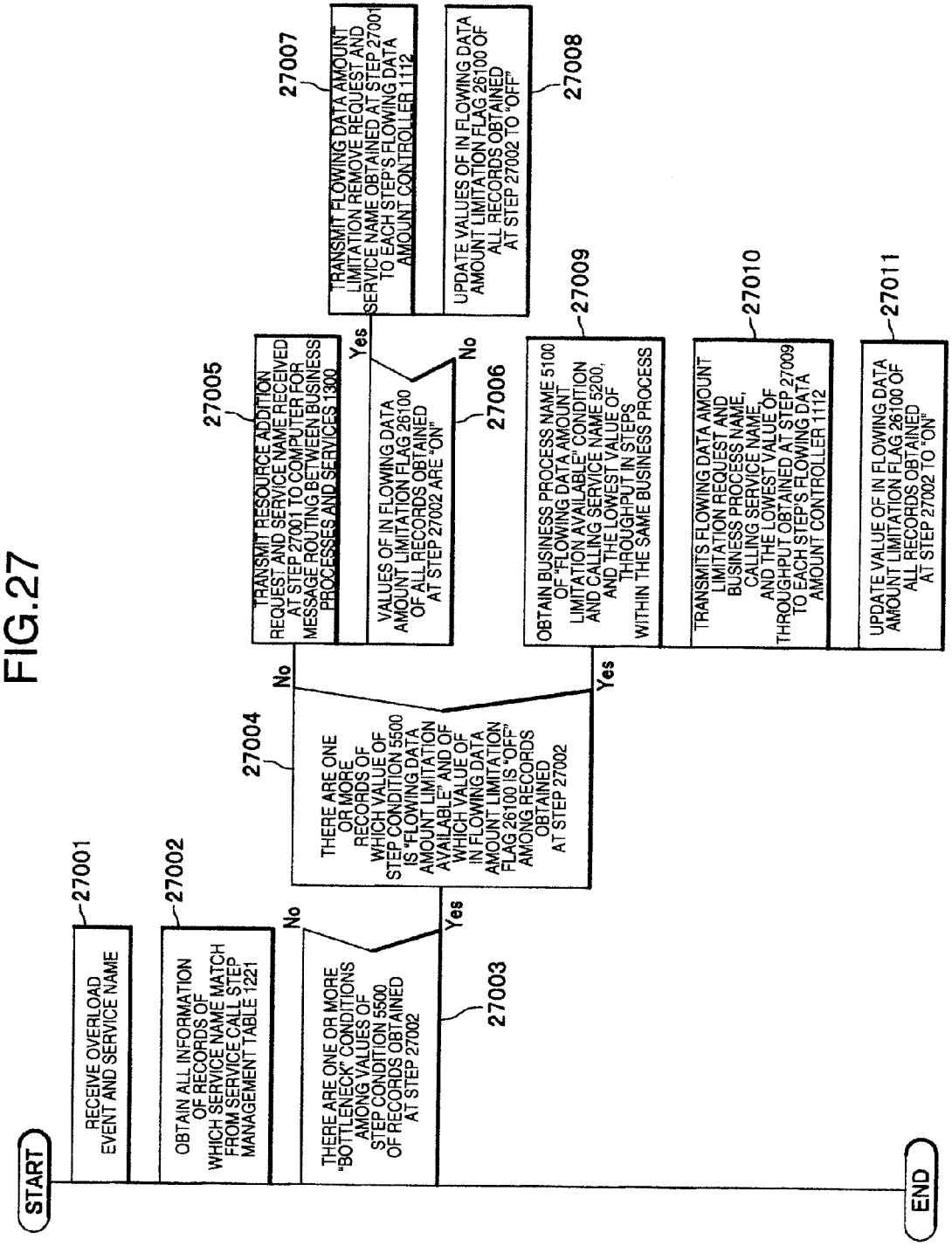

BUSINESS PROCESS MANAGEMENT SYSTEM, METHOD THEREOF, PROCESS MANAGEMENT COMPUTER AND PROGRAM THEREOF

This application claims priority from Japanese patent application 2007-191151, filed on Jul. 23, 2007. The entire content of the aforementioned application is incorporated herein by reference.

BACKGROUND OF THE INVENTION

The present invention relates to a system which operates and manages a business process, etc.

A technique which makes it possible to execute a large amount of process equal to or more than one high execution server by executing the load distribution between a plurality of servers is in the process of being developed. For example, in U.S. Patent Application Publication US 2003/0069972 A1, a grid technique which enhances the availability of the resources by dynamically changing the number of the servers within a load distribution cluster and utilizing the idle resources efficiently is disclosed.

On the other hand, a technique which constructs a system which executes a business process by flexibly combining groups of services which the existing software provide so as to quickly correspond to the change of the business is also in the process of being developed. For example, in U.S. Patent Application Publication US 2005/0102674 A1, a technique to make it easy to operate a system which executes a business process like this is disclosed.

The service here means a function which an application which runs on a computer provides. Also, many of the services are installed as an application which can be used using a standard interface. For example, it can be considered a stock inquiry service which has a function that when a user transmits a request to obtain a stock amount adding a product name and a store name, it returns the stock amount of the designated product in the designated store as a response.

Also, the business process is one of the entities which call the above-mentioned service. For example, when there are three services of an order reception service, a stock inquiry service, and a shipping service which individually exist, a process which executes a series of processes which process an order combining the services by defining a calling order of these, etc. is called a business process. Many of the business processes are installed as an application which can be used using a standard interface in the same way as the service. Also, as a representation of a business process definition language which defines the above-mentioned calling order of services, etc., there is BPEL (Business Process Execution Language), and it is in the process of being standardized and is widely noticed.

It can be considered to construct a business system which efficiently utilizes the resources and can quickly correspond to the change of the business by combining the grid technique and the technique which executes the business process which have been explained above.

SUMMARY OF THE INVENTION

The configuration in which the conventional techniques are simply combined, namely the configuration which executes the service which the business process calls in the grid environment, has the following problems.

The first problem is that there is a case where the addition of the resource which is executed for the service which is executed in the grid environment contributes to the enhancement of the throughput of the service but does not contribute to the enhancement of the throughput as a business process. FIG. 24 is a condition in which the loads of the CPUs (Central Processing Unit) of two servers which execute the different services in the grid environment have been increased and the allocation of the idle server for addition is to be executed as the addition of the resource.

In the business process execution environment, the decrease of the throughput of a service call step D in a business process A results in a stagnation of the requests and it becomes a bottleneck of the entire business process A. In such a case, when the idle resources are few, a resource should be added for the service call step D in order to enhance the throughput of the business process A, but, for example, depending on the timing of the detection of the CPU overload of the server, the resource is happened to be added to a service call step B which also has the decrease in its throughput. In this case, as the throughput of the service call step D is not enhanced, even if the resource is added, the stagnation of the process of the business process A cannot be solved.

The second problem is that the resource which the service call step which does not contribute to the enhancement of the throughput of the business process consumes affects the throughput of other business process. For example, FIG. 25 is the condition in which a business process B is executed and the business process A and the business process B share a service B in addition to the condition in FIG. 24.

In the environment shown in FIG. 25, the bottleneck of the business process A is the service call step D and even if a large amount of requests is processed adding the resource to the service call step B, it does not contribute to the enhancement of the throughput of the business process A. And, if the service call step B of the business process A uses the CPU of the server in a large degree, it oppresses the CPU which is used in a service call step B of the business process B and the throughput of the business process B is decreased as a result.

Therefore, the present invention aims at providing a method to make it possible to add an adequate resource in order to enhance the throughput of the business process when the server falls in the condition of the resource insufficiency in a process in which a plurality of servers are called by the service call steps and are executed.

A business process management system according to the present invention is a business process management system which is configured connecting each other via a network a plurality of application servers comprising a service execution unit which has a function to provide a designated service, a process execution computer comprising a process execution unit which executes a process which is configured with a service call step which calls and uses said service execution unit, and a process management computer which determines a processing condition of said service call step when said process is executed, wherein said process management computer comprises a storage part in which a service call step management table which holds at least a execution order in said process corresponding to said service call step which is executed in said process and a throughput of said service call step per said process are stored, a service call step manager which extracts the throughput and the execution order regarding said service call step per said process from said service call step management table, and determines whether a condition of the service call step in said process is a bottleneck condition or a condition in which the throughput can be limited or a condition other than these from these extracted throughput and execution order and stores each in said service call step management table, and an operation selector for overload which on obtaining information which indicates that the load of said application server has been increased via said network, extracts the condition of the service call step which is calling the service execution unit of the application server of which load has been increased from said Service call step management table and determines whether this extracted condition is a bottleneck condition or not, and if it is the bottleneck condition, determines whether there is a condition other than the bottleneck in the condition of the service call step in other processes which is calling the service execution unit on said application server, if there is not a condition other than the bottleneck, decides the addition of a resource for said application server, if there is a condition in which the throughput can be limited other than the bottleneck in the condition of the service call step in other processes, decides to limit the throughput of the service call step of other process.

Regarding other aspects of the present invention, it will be explained in detail in the description of the embodiments which will be described later.

According to the present invention, as it is possible to specify the service call step which becomes the bottleneck of the process, when the resource insufficiency has occurred in the service call step, the adequate addition of the resource can be executed. Also, according to the present invention, it can prevent the case where the throughput of the business process is not enhanced even if the server addition is executed, and the case where the computer resource is used in a large amount regardless of that the throughput of the business process is not enhanced and it affects badly the throughput of other business process. Therefore, the adequate resource addition can be executed in order to enhance the throughput of the business process.

BRIEF DESCRIPTION OF THE DRAWINGS

FIG. 4 is a diagram showing information held in a resource management table.

FIG. 7 is a diagram showing information held in a service management table.

FIG. 8 is a diagram showing a device configuration of a business process management computer.

FIG. 9 is a diagram showing information to be stored in a service call step management table.

FIG. 11 is a diagram showing a business process execution condition display screen.

FIG. 15 is a diagram showing information held in the resource management table.

FIG. 16 is a diagram showing information held in the service management table.

FIG. 17 is a diagram showing information held in the service call step management table.

FIG. 19 is a diagram showing information held in the service management table.

FIG. 20 is a diagram showing information held in the service call step management table.

FIG. 21 is a diagram showing information held in the service call step management table.

FIG. 26 is a diagram in which a column to correspond to a case where the addition of the resource is executed in a case where the effect by the flowing data amount limitation is insufficient is added to the service call step management table of FIG. 9.

FIG. 27 is a PAD diagram in which a process to correspond to the case in which the resource addition is executed in the case where the effect by the flowing data amount limitation is insufficient is added in addition to the operation decision process of FIG. 13.

DESCRIPTION OF THE EMBODIMENTS

Figure 1:
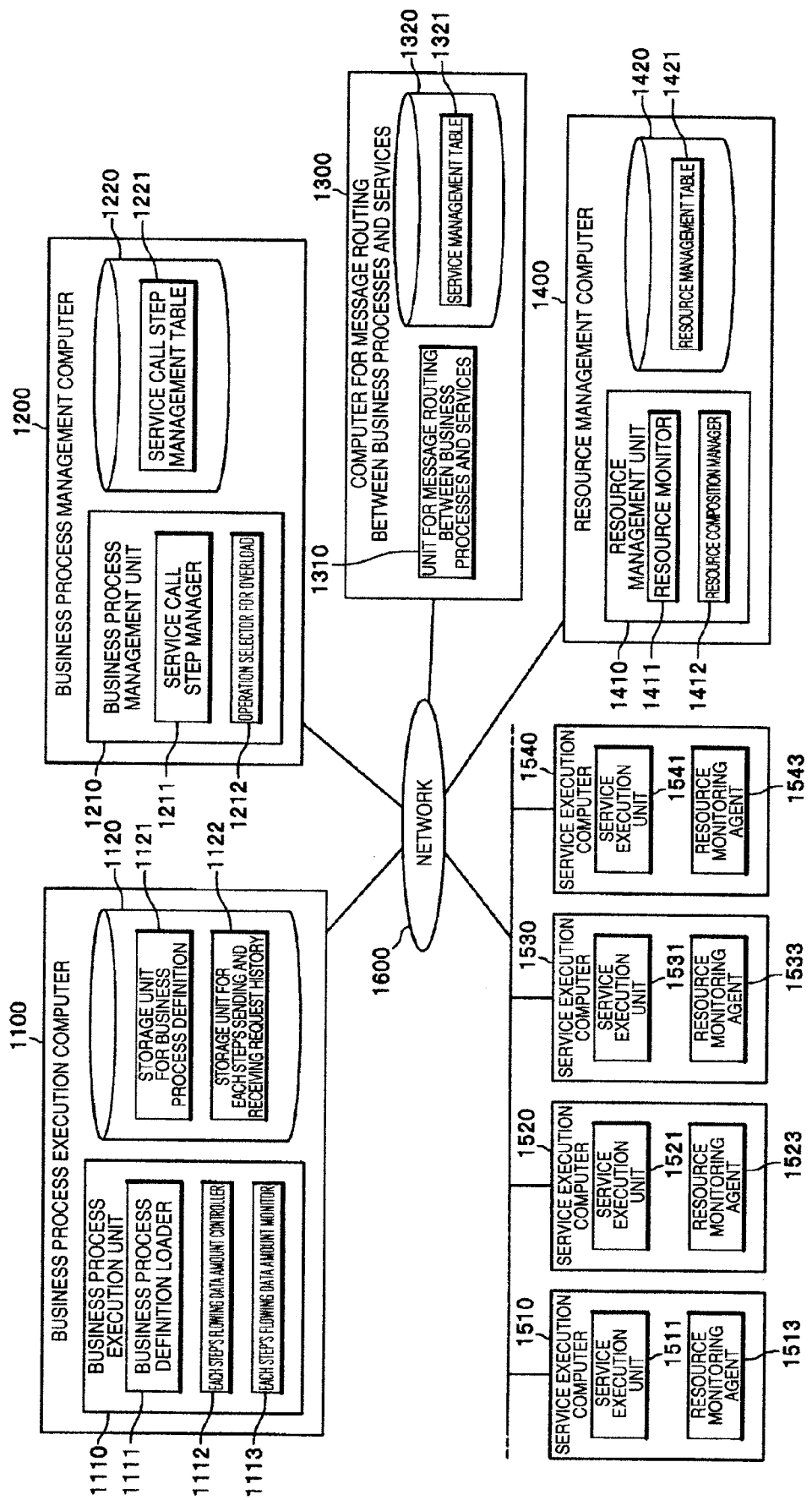
FIG. 1 is a system configuration diagram of a business process execution environment.

It will be explained about preferred embodiments of the present invention referring to the accompanying drawings below.

First Embodiment

The process according to a first embodiment of the present invention is configured with a process which periodically monitors the load of a group of servers which provide services and the condition of a group of business processes which adequately call and use the above-mentioned services, and a process which decides an operation according to the condition of each business process on the occasion of the detection of the overload of the server.

Here, the condition of the business process indicates a condition of each service call step which is decided from the order in which the service is called in the business process and from the value of the throughput per step which calls the service (hereinafter it will be called a service call step) in the business process.

Here, the condition of each service call step is defined as three conditions of a "normal" condition, a "bottleneck" condition, and a "flowing data amount limitation available" condition from the result of comparing each other the orders of each service call step and the values of their throughputs.

The "bottleneck" condition is a condition which corresponds to the service call step which is the bottleneck of the process of said business process and it indicates that it is the step with which the throughput of the business process is expected to be enhanced if the throughput of said service call step is enhanced.

The "flowing data amount limitation available" condition is a condition which corresponds to the service call step with which even if the throughput of said step is decreased to a certain value, it does not affect the throughput of the business process.

When a business process management computer which will be described later accepts a notification of overload of the server, it decides the operations as followings according to the conditions of all of the service call steps which are calling the services which run on said server and the combination of the conditions.

When there is no service call step in the "bottleneck" condition among said service call steps the operation is not executed.

Also, when there are one or more service call steps of the "bottleneck" condition and the "flowing data amount limitation available" condition respectively among said service call steps, the flowing data amount limitation of the service call step in the "flowing data amount limitation available" condition is executed.

Further, if there are one or more service call steps of the "bottleneck" condition and there is no service call step of the "flowing data amount limitation available" condition among said service call steps, the resource is added to the server of which load has been increased.

It will be explained about an example of a system configuration of this embodiment, and next, the aspect of its operation will be explained using a PAD diagram and finally an example of an operation of the present invention assuming a certain condition (operation example 1 and operation example 2) will be shown below.

FIG. 1 is an example of a system configuration diagram of a business process execution environment of this embodiment. The system of this embodiment is configured including a group of service execution computers (1510~1540) which executes a plurality of services, a resource management computer 1400 which manages this group of service execution computers (1510~1540), a business process execution computer 1100 which executes a business process, a business process management computer 1200 which manages the operation of the business process, a computer for message routing between business processes and services 1300 which executes the routing of the message transmitted and received between the business process and the service and the routing of an event notification and instruction transmission which are transmitted and received between the resource management computer 1400 and the business process management computer, and a network 1600 which connects each device each other.

It will be explained about each device in detail below.
(Service Execution Computer)

Figure 2:
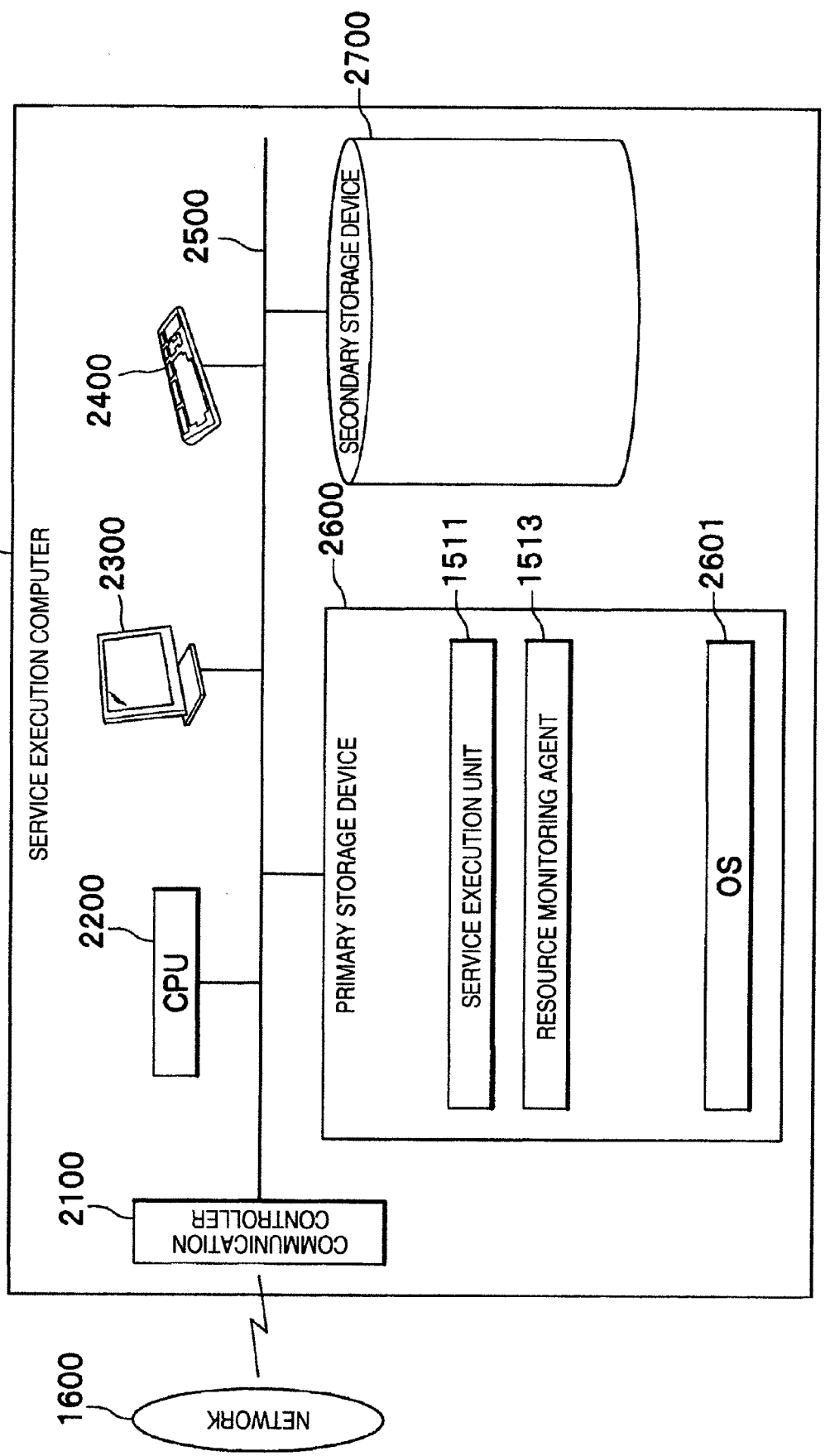
FIG. 2 is a diagram showing a device configuration of a service execution computer.

The group of service execution computers (1510~1540) is a group of servers each of which is one server or a plurality of servers and each of them is a device of which throughput can be enhanced by dynamically adding a server. Also, said each server may be a virtual server. When it is a virtual server, its throughput can be enhanced in the same way by changing the usage amount of the computer resources such as a CPU, a memory, etc. which one virtual server can use. Here, FIG. 2 is a diagram showing an example of a device configuration of the service execution computer 1510 in this embodiment. Here, it will be explained about the service execution computer 1510 as an example, but the device configurations of other service execution computers (1520~1540) are the same.

The service Execution Computer 1510 is configured including a communication controller 2100, a CPU 2200, a display 2300, a keyboard 2400, a system bus 2500, a primary storage device 2600, and a secondary storage device 2700.

The communication controller 2100 transmits and receives messages on the network 1600 according to the instruction of the CPU 2200. The display 2300 and the keyboard 2400 are used when a manager executes the setup. In the primary storage device 2600, a service execution unit 1511, a resource monitoring agent 1513, and an OS (Operating System) 2601 are stored and they are executed by the CPU 2200. In the secondary storage device 2700, data to be used by a program stored in the primary storage device 2600 is stored and the readout and the storage of the information are executed according to the instruction of the CPU 2200.

The service execution unit 1511 executes the service installed in said processing part. The service executes a process to return a response in response to a call from a business process execution unit 1110 of the business process execution computer 1100 which will be described later. The process to call the service execution unit 1511 from the business process execution unit 1110 and the process to return the response to the business process execution unit 1110 from the service execution unit 1511 means to receive and transmit the message via the network 1600 and the computer for message routing between business processes and services 1300 and it is executed using HTTP (Hyper Text Transfer Protocol), SOAP (Simple Object Access Protocol), etc. Here, the processing contents of the service installed in the service execution unit 1511 are set according to the kind of the service execution computers (1510~1540).

Also, the process to execute the service is a process to execute a process according to the above-mentioned calling of service and to extract information necessary to the response. As an example of the service, it can be considered a stock inquiry service which has a function, in response to a call to designate a certain product name and to request the stock amount of the rest of said product, to compute the stock amount of the rest of the designated product and to return the number of the stock of the rest as an response, etc. The process in response to the call in this example of the service corresponds to a process which uses the product name which it received when it was called and obtains the stock amount of the rest of said product.

The resource monitoring agent 1513 monitors the CPU utilization of the service execution computer 1510 and stores the value. The value of said CPU utilization is periodically read out from a resource monitor 1411 which will be described later. The service execution unit 1511 and the resource monitoring agent 1513 are installed as programs to be executed by the CPU.

Here, in this embodiment, the group of service execution computers (1510~1540) is shown as each of them is a separate server, but each service execution computer may be a virtual device which is implemented as a program executed on one server. Also, the service execution unit 1511 and the resource monitoring agent 1513 may have a configuration to be installed in hardware (an integrated circuit chip, etc.).

(Resource Management Computer)

Figure 3:
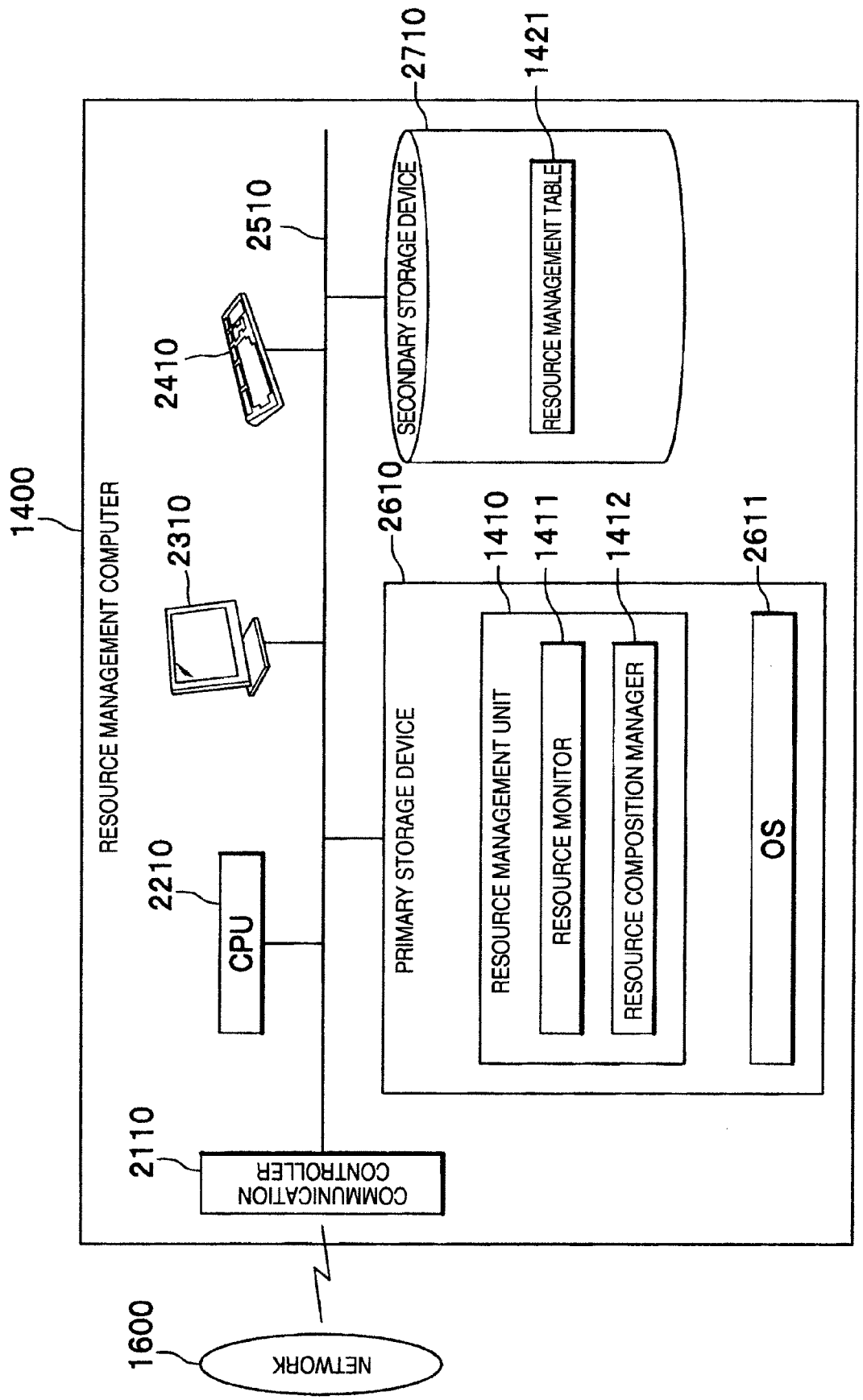
FIG. 3 is a diagram showing a device configuration of a resource management computer.

Next, it will be explained about the resource management computer 1400. Here, FIG. 3 is a diagram showing an example of a device configuration of the resource management computer 1400 in this embodiment. The resource management computer 1400 is configured including a communication controller 2110, a CPU 2210, a display 2310, a keyboard 2410, a system bus 2510, a primary storage device 2610, and a secondary storage device 2710.

The communication controller 2110 transmits and receives messages on the network 1600 according to the instruction of the CPU 2210. The display 2310 and the keyboard 2410 are used when the manager executes the setup. In the primary storage device 2610, a resource management unit 1410 and an OS 2611 are stored and they are executed by the CPU 2210. In the secondary storage device 2710, a resource management table 1421 is stored and the readout and the storage of the information are executed according to the instruction of the CPU 2210. Also, the resource management unit 1410 is configured including a resource monitor 1411 and a resource composition manager 1412.

In this embodiment, the resource management unit 1410 is supposed to be installed as a program but it also may be installed as hardware.

The resource monitor 1411 periodically collects the CPU utilization of the service execution computers (1510~1540) from the resource monitoring agents (1513~1543) of the service execution computers (1510~1540) and if any one of the CPU utilizations of the service execution computers (1510~1540) exceeds 80%, transmits an overload event which indicates that the increment of the load has occurred in the service execution computers (1510~1540) to the business process management computer 1200 via the computer for message routing between business processes and services 1300.

The resource composition manager 1412 executes the server addition (the addition of the resource) to any one of the designated service execution computers (1510~1540) according to the server addition request which the business process management computer 1200 transmits via the computer for message routing between business processes and services 1300.

The resource management table 1421 holds configuration information and load information of the resources. Here, FIG. 4 is a diagram showing an example of information held in the resource management table 1421 in this embodiment. In the resource management table 1421, information of "resource name" 3100, "average CPU utilization" 3200, and "load condition" 3300 are held. The "resource name" 3100 is a name to uniquely identify the service execution computers (1510~1540) and is set by the manager.

Also, the "average CPU utilization" 3200 is an average CPU utilization of the service execution computers (1510~1540) collected from the resource monitoring agents (1513~1543) of the service execution computers (1510~1540) and its value is periodically updated by the resource monitor 1411. The "load condition" 3300 is a value indicating the condition of the load determined by the "average CPU utilization" 3200, and if the value of the "average CPU utilization" 3200 is no less than 80% "overload" is set, and if it is less than 80% "normal" is set respectively. Here, the "load condition" 3300 is updated with the same timing as the timing with which the value of the "average CPU utilization" 3200 is updated.

(Business Process Execution Computer)

Figure 5:
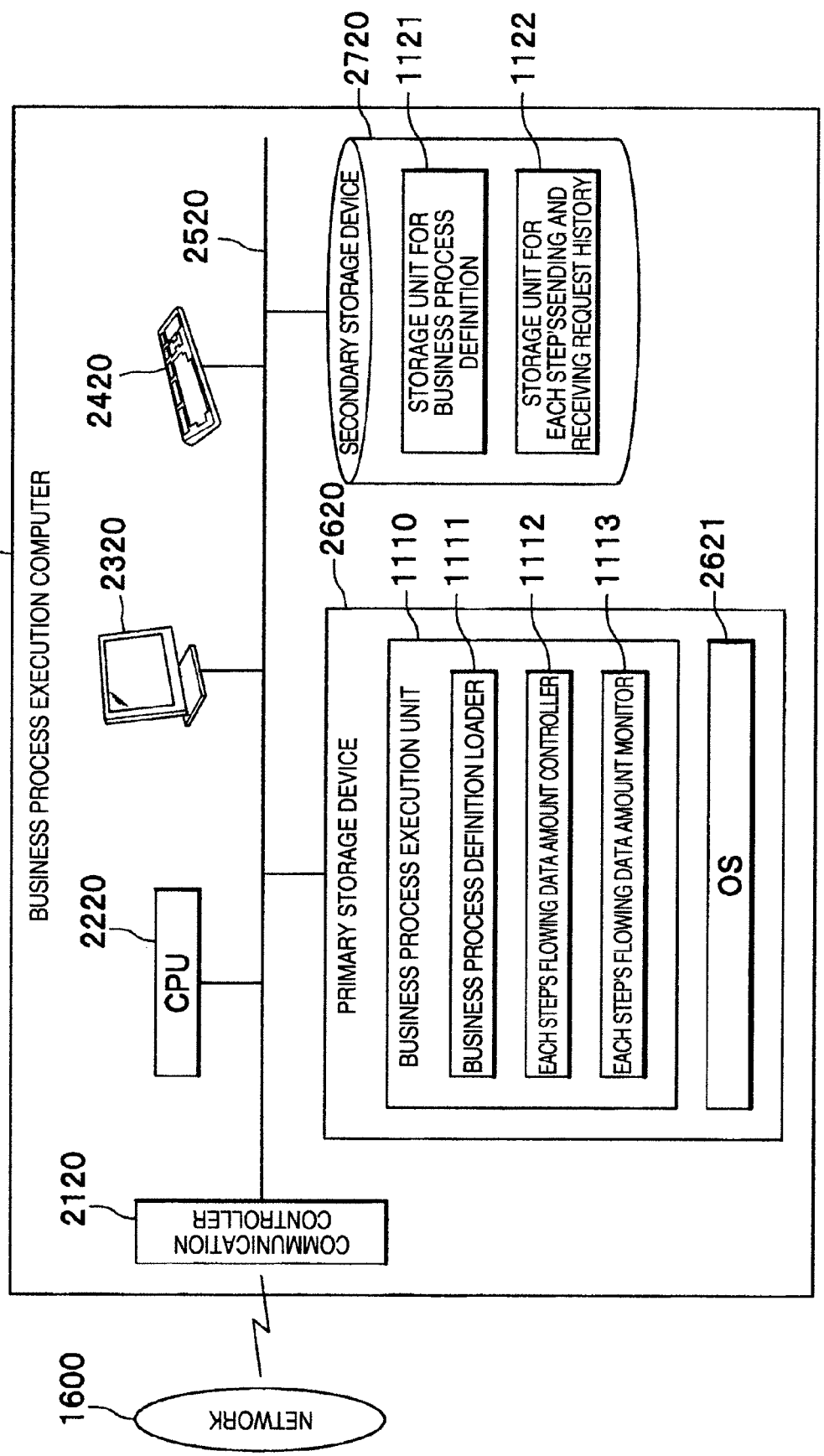
FIG. 5 is a diagram showing a device configuration of a business process execution computer.

Next, it will be explained about the business process execution computer 1100. Here, FIG. 5 is a diagram showing an example of a device configuration of the business process execution computer 1100 in this embodiment. The business process execution computer 1100 is configured including a communication controller 2120, a CPU 2220, a display 2320, a keyboard 2420, a system bus 2520, a primary storage device 2620, and a secondary storage device 2720.

The communication controller 2120 transmits and receives messages on the network 1600 according to the instruction of the CPU 2220. The display 2320 and the keyboard 2420 are used when the manager executes the setup. In the primary storage device 2620, a business process execution unit 1110 and an OS 2621 are stored and they are executed by the CPU 2220. In the secondary storage device 2720, a storage unit for business process definition 1121 and a storage unit for each step's sending and receiving request history 1122 are stored and the readout and the storage of the information are executed according to the instruction of the CPU 2220. Also, the business process execution unit 1110 is configured including a business process definition loader 1111, an each step's flowing data amount controller 1112, and an each step's flowing data amount monitor 1113. In this embodiment, the business process execution unit 1110 is supposed to be installed as a program but it also may be installed as hardware.

Here, the business process is a combination of more than one services and it accepts a request from a client program which is not shown and executes the process. In the storage unit for business process definition 1121, names and calling order of the services to be called are stored by the manager.

The business process execution unit 1110, on accepting a request, reads out the definition information of the business process from the storage unit for business process definition 1121 using the business process definition loader 1111, and executes the group of services recorded in said definition information in the designated execution order.

For example, it is assumed the case where the group of services which is recorded in the definition information are three services of an order acceptance service, a stock inquiry service, and a shipping service and these three services run on the three service execution computers (1510, 1520, 1530). Here, the business process which executes in order of the order acceptance service, the stock inquiry service, and the shipping service is defined as an order processing business process and stored in the storage unit for business process definition 1121.

The business process execution unit 1110, on accepting a request for said order processing business process, reads out the execution order from the storage unit for business process definition 1121, calls the services (each service execution computer (1510, 1520, 1530)) according to the execution order which is read out, and executes the business process.

The each step's flowing data amount controller 1112 controls the request amount which is transmitted from each service call step of the business process to the service (each service execution computer (1510, 1520, 1530)) via the computer for message routing between business processes and services 1300.

The each Step's flowing data amount monitor 1113 monitors the messages transmitted and received from and by each service call step of the business process and stores history information including time when the service calling is normally terminated, a business process name, and a calling service name in the storage unit for each step's sending and receiving request history 1122. The history information stored in the storage unit for each step's sending and receiving request history 1122 is used for the calculation of the throughput by the unit within the business process management computer 1200.

(Computer for Message Routing Between Business Processes and Services)

Figure 6:
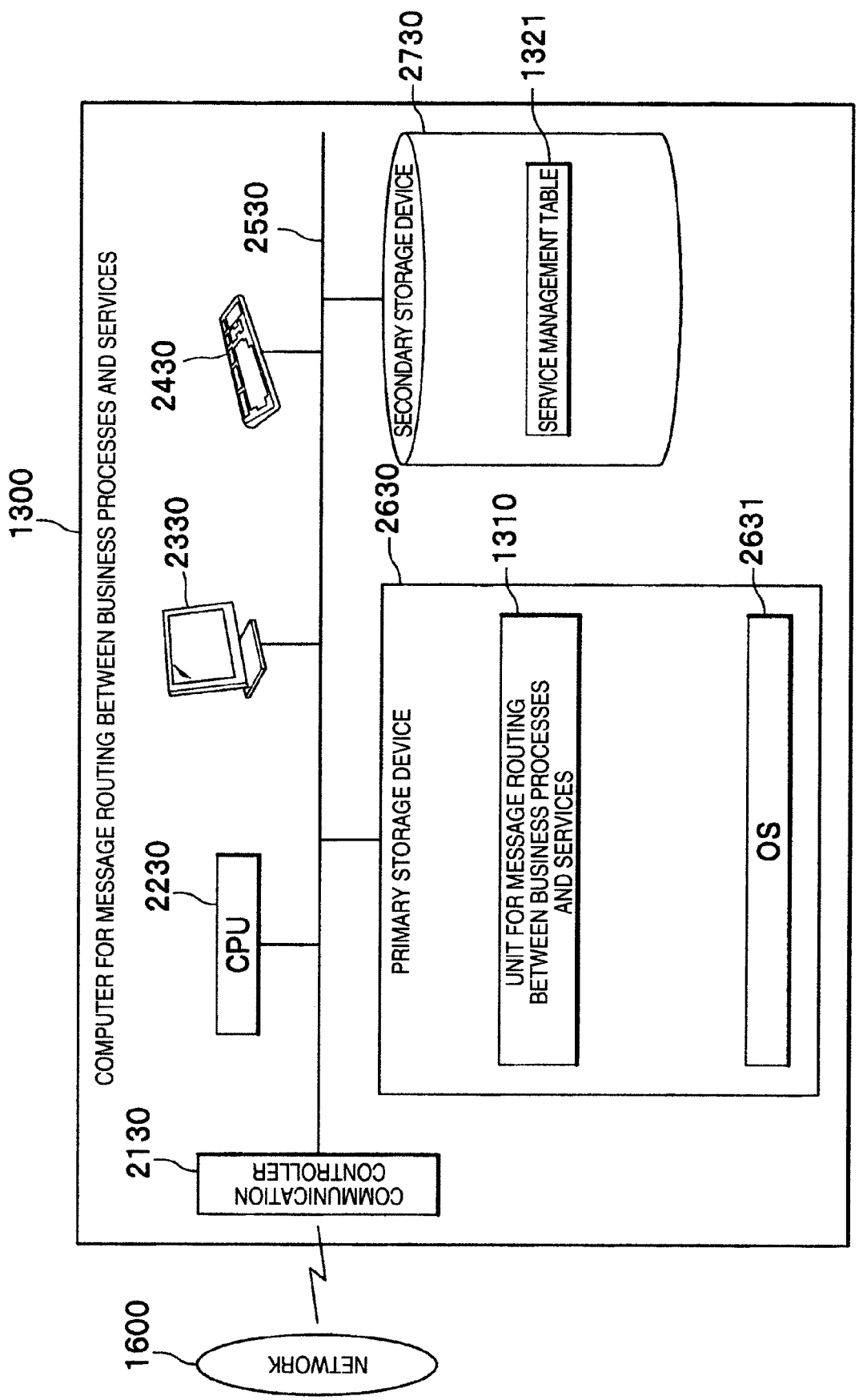
FIG. 6 is a diagram showing a device configuration of a computer for message routing between business processes and services.

Next, it will be explained about the computer for message routing between business processes and services 1300. Here, FIG. 6 is a diagram showing an example of a device configuration of the computer for message routing between business processes and services 1300 in this embodiment. The computer for message routing between business processes and services 1300 is configured including a communication controller 2130, a CPU 2230, a display 2330, a keyboard 2430, a system bus 2530, a primary storage device 2630, and a secondary storage device 2730.

A unit for message routing between business processes and services 1310 routes the messages transmitted and received between the business process execution computer 1100 and the service execution computers (1510~1540) and the messages transmitted and received between the business process management computer 1200 and the resource management computer 1400 (an event message indicating the overload of the server and a message to communicate the server addition instruction) using the information of the service management table 1321.

Also, in this embodiment, the unit for message routing between business processes and services 1310 is shown as an example to be installed as a program, but it may have a configuration to be installed by hardware.

Here, FIG. 7 is a diagram showing an example of information held in the service management table 1321 in this embodiment. As shown in FIG. 7, the service management table 1321 manages the correspondence of "service name" 4100 which the business process calls and "operating destination resource name" 4200 in which the service is operated and the manager sets them.

(Business Process Management Computer)

Next, it will be explained about the business process management computer 1200. Here, FIG. 8 is a diagram showing a device configuration of the business process management computer 1200 in this embodiment. As shown in FIG. 8, the business process management computer 1200 is configured including a communication controller 2140, a CPU 2240, a display 2340, a keyboard 2440, a system bus 2540, a primary storage device 2640, and a secondary storage device 2740.

The communication controller 2140 transmits and receives messages on the network 1600 according to the instruction of the CPU 2240. The display 2340 and the keyboard 2440 are used when the manager executes the setup. In the primary storage device 2640, a business process management unit 1210 and an OS 2641 are stored and they are executed by the CPU 2240. In the secondary storage device 2740, a service call step management table 1221 is stored and the readout and the storage of the information are executed according to the instruction of the CPU 2240.

The business process management unit 1210 stored in the primary storage device 2640 includes a service call step manager 1211 and an operation selector for overload 1212. The service call step manager 1211 manages the configuration and the condition of each business process per each service call step based on the information stored in the service call step management table 1221.

Here, FIG. 9 is a diagram showing an example of information to be stored in the service call step management table 1221. The values of "business process name" 5100, "calling service name" 5200, and "calling order" 5300 of the service call step management table 1221 are input by the manager based on the definition information of the business process stored in the storage unit for business process definition 1121 of the business process execution computer 1100. Also, in "throughput" 5400 a value which the service call step manager 1211 calculates based on the information of the storage unit for each step's sending and receiving request history 1122 of the business process execution computer 1100 is stored. Further, the value of the "throughput" 5400 is computed by calculating the times of the normal termination of the service calling from each service call step included in the history information stored in the storage unit for each step's sending and receiving request history of the business process execution computer 1100 per one minute.

Also, a value stored in "step condition" 5500 indicates the condition of each service call step. This value stored in the "step condition" 5500 is decided to be any one of three values of "normal", "bottleneck", and "flowing data amount limitation available" from the comparison result of each "calling order of step" 5300 and "throughput" 5400.

Here, the "bottleneck" is a value indicating a condition which is a bottleneck of the processing of the business process and it indicates that it is a step with which the throughput of the business process is expected to be enhanced if the throughput of said step is enhanced.

Also, the "flowing data amount limitation available" indicates that it is a step with which the throughput of the business process is not affected even if the throughput of said step is decreased to a certain value. The processing to decide these values and store them in the service call step management table 1221 is executed after updating the above-mentioned value of the "throughput" 5400. The details of the processing to decide the value of the "step condition" 5500 and store it in the service call step management table 1221 will be described later.

The operation selector for overload 1212 accepts the "overload event" transmitted from the resource management computer 1400 via the computer for message routing between business processes and services 1300 and decides and instructs the operation for this based on the information of the service call step management table 1221. The details of the processing to decide and instruct the operation will be described later.

(Operation of Each Device)

Figure 10:
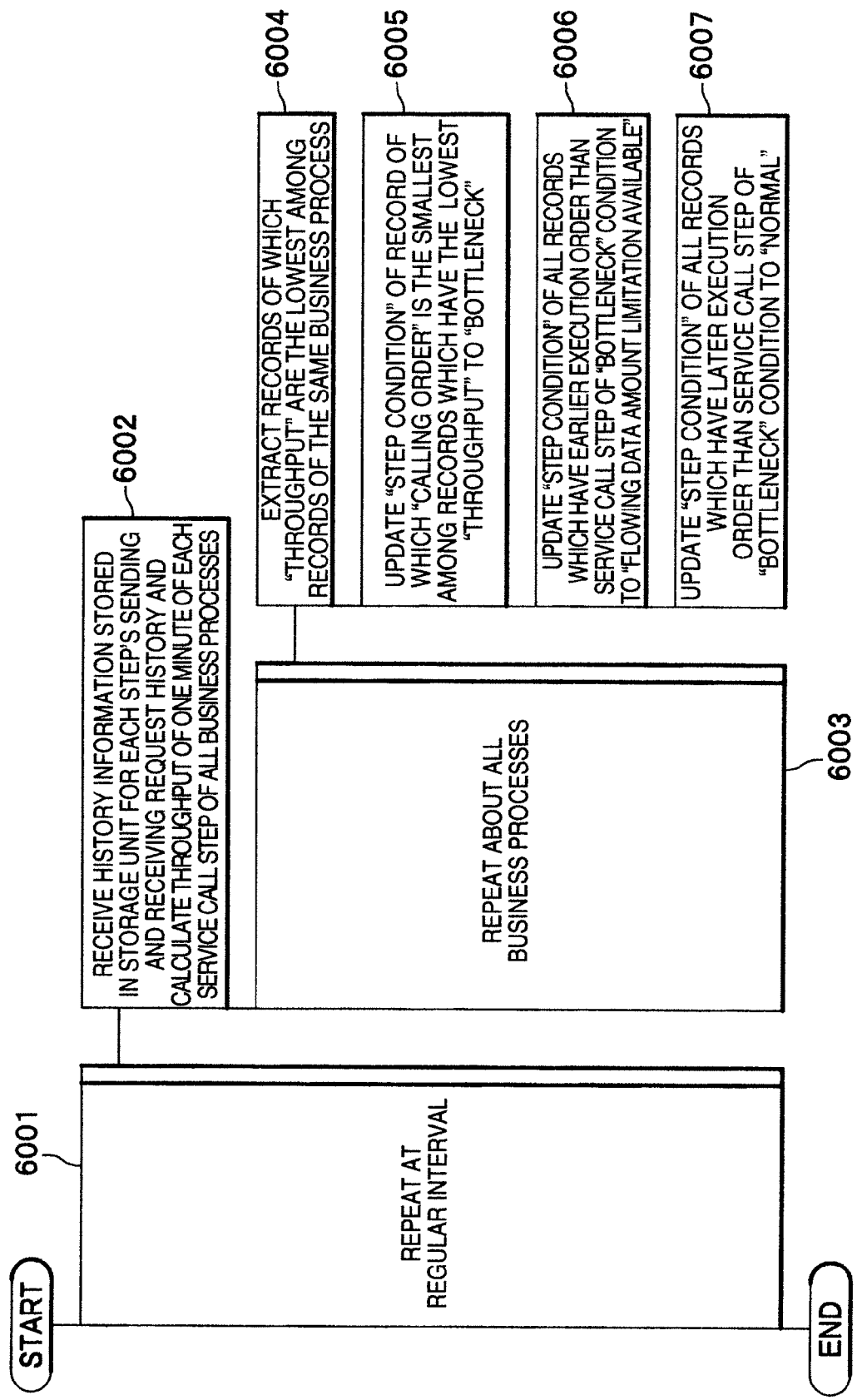
FIG. 10 is a PAD diagram showing a procedure of an "execution monitoring and management" phase which is a process which periodically monitors a load of a group of service execution computers and the condition of a group of business processes.
Figure 13:
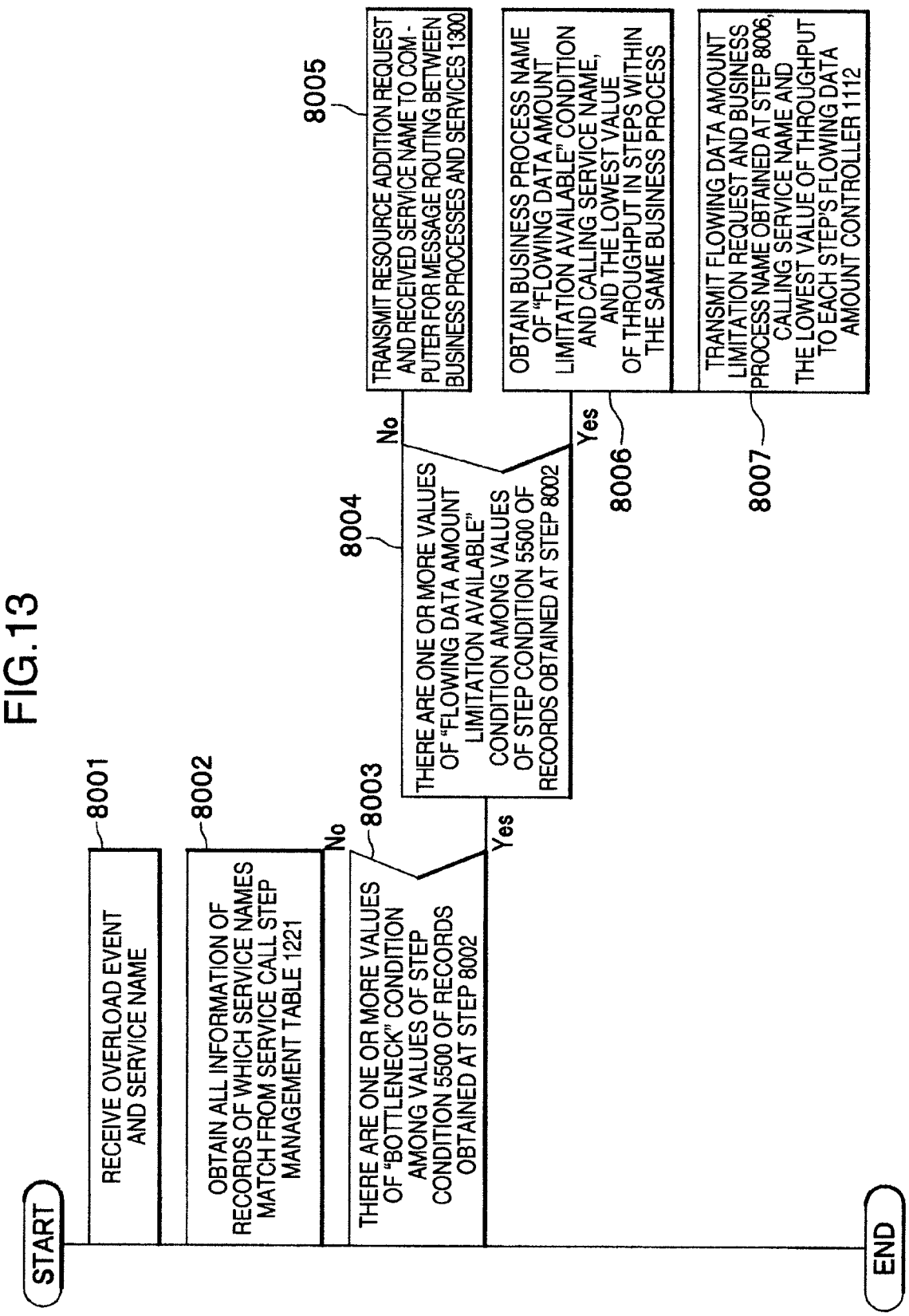
FIG. 13 is a PAD diagram showing a procedure of an "overload operation" phase which is a process which decides an operation according to the condition of the business process on the occasion of the detection of the overload of the server.

The operation of the business process management computer 1200 of this embodiment will be explained using PAD diagrams shown in FIGS. 10 and 13. Here, the PAD diagram shown in FIG. 10 shows a procedure of a "execution monitoring and management" phase which is a process to periodically monitor the load of the group of service execution computers (1510~1540) and the condition of the group of business processes, and the PAD diagram shown in FIG. 13 shows a procedure of a "overload operation" phase which is a process to decide the operation according to the condition of the business process on the occasion of the detection of the overload of the server.

Also, a procedure with which the computer for message routing between business processes and services 1300 routes the overload event message which is transmitted from the resource management computer 1400 to the business process management computer 1200 will be explained together using a PAD diagram shown in FIG. 12. Here, the overload event means an event that the load of the service execution computers (1510~1540) has been increased.

(Execution Information Monitoring and Management Phase)

First, it will be explained about the "execution information monitoring and management" phase. Here, FIG. 10 is a PAD diagram showing an example of processing in which the service call step manager 1211 of the business process management computer 1200 periodically updates the condition of the business process.

More specifically, it is a flow of the processing in which the service call step manager 1211 calculates the present throughput per service call step based on the history information which the each step's flowing data amount monitor 1113 of the business process execution computer 1100 output to the storage unit for each step's sending and receiving request history 1122, decides the condition of each service call step from this calculated throughput and the execution order of the service call step, and until stores the value corresponding to this decision in the service call step management table 1221.

First, at step 6001, the service call step manager 1211 of the business process management computer 1200 repeats the processing from step 6002 to step 6007 at a certain interval (for example, every one minute).

Then, at the step 6002, the service call step manager 1211 receives the history information stored in the storage unit for each step's sending and receiving request history 1122 from the business process execution computer 1100 via the network 1600 and calculates the times of the reception of the message indicating that the execution of the service is normally terminated within the past one minute (the throughput of one minute) about each service call step of all of the business processes. Then, this calculation result is stored in the "throughput" 5400 of a record corresponding to each service call step of the service call step management table 1221. Here, the time interval to calculate the throughput can be changed optionally.

Next, at the step 6003, the service call step manager 1211 extracts records which have the same value of the "business process name" 5100 from the service call step management table 1221 (see FIG. 9) and repeats the processing of step 6004 to step 6007 which will be described later per this extracted record about all of the business processes.

Then, at the step 6004, a record which has the lowest value of the "throughput" 5400 among the records of the same business process is extracted from the records extracted at the step 6003. On this occasion, when there are a plurality of records which have the lowest value of the "throughput" 5400, all of them are extracted.

Next, at the step 6005, a service call step which has the smallest value of the "calling order" 5300, namely a service call step which has the earliest execution order, among the records which have the lowest throughput extracted at the step 6004 is extracted, and the value of the "step condition" 5500 of this extracted service call step is updated to the "bottleneck". This updated value of the "step condition" 5500 is stored in the service call step management table 1221.

Next, at the step 6006, the service call step manager 1211 updates the value of the "step condition" 5500 of all of the records which have smaller value of the "calling order" 5300 than the value of the "calling order" 5300 of the records of the "bottleneck" condition which were decided at the step 6005, namely the records which have earlier execution order than the service call step of the "bottleneck" condition, among all of the records which have the same value of the "business process name" 5100 in the service call step management table 1221 to the "flowing data amount limitation available", and stores this value in the service call step management table 1221.

Then, at the step 6007, it updates the value of the "step condition" 5500 of all of the records which have larger value of the "calling order" 5300 than the value of the "calling order" 5300 of the records of the "bottleneck" condition which were decided at the step 6005, namely the records which have later execution order than the service call step of the "bottleneck" condition, among the records which have the same value of the "business process name" 5100 in the service call step management table 1221 to the "normal", and stores this value in the service call step management table 1221.

As it has been described above, it is possible to manage whether each service call step of the business process is in the "bottleneck" condition in that business process or in the "flowing data amount limitation available" condition which does not affect the throughput of the business process even if the flowing data amount limitation is executed to the adequate flowing data amount which will be described later or in the "normal" condition by the service call step management table 1221 by executing the procedure shown in FIG. 10.

Also, the information stored in the service call step management table 1221 updated through the procedure shown in FIG. 10 can be printed out using an electronic file or a printer not shown or can be output as a display screen displayed on the display as the need arises. Here, FIG. 11 is a diagram showing an example of a business process execution condition display screen which displays the information stored in the service call step management table 1221. In a business process execution condition display screen 5001 shown in FIG. 11, it can be seen that the information stored in the service call step management table 1221 shown in FIG. 9 is displayed.

The manager of the execution environment of said business process can confirm which service call step is the bottleneck of the throughput in the business process which is executed in the business process execution computer 1100 and can form a reinforcement plan of the resources such as a server, etc. based on this information by referring to this business process execution condition display screen 5001. Also, the operation in the case where the throughput of the business process is stagnant can be executed quickly.

(Notification of Overload Event)

Next, a process in which the resource monitor 1411 of the resource management computer 1400 periodically monitors the load of the service execution computers (1510~1540) and when it detects that there is a service execution computer (1510~1540) which has the overload, transmits the overload event will be explained.

The resource monitor 1411 periodically collects the average CPU utilization of each service execution computer (1510~1540) from the resource monitoring agents (1513~1543) and stores the values in the "average CPU utilization" 3200 of the resource management table 1421 (see FIG. 4), and in a record corresponding to the service execution computer which has the value of the average CPU utilization less than 80% it stores "normal" indicating that the load is in the "normal" condition in the "load condition" 3300 and in a record corresponding to the service execution computer (1510~1540) which has the value no less than 80% it stores "overload" indicating that it is in the overload condition in the "load condition" 3300. When it detects the overload condition, it transmits an overload event indicating that the increment of the load has occurred and the resource name of the service execution computer which has become the overload to the computer for message routing between business processes and services 1300.

Figure 12:
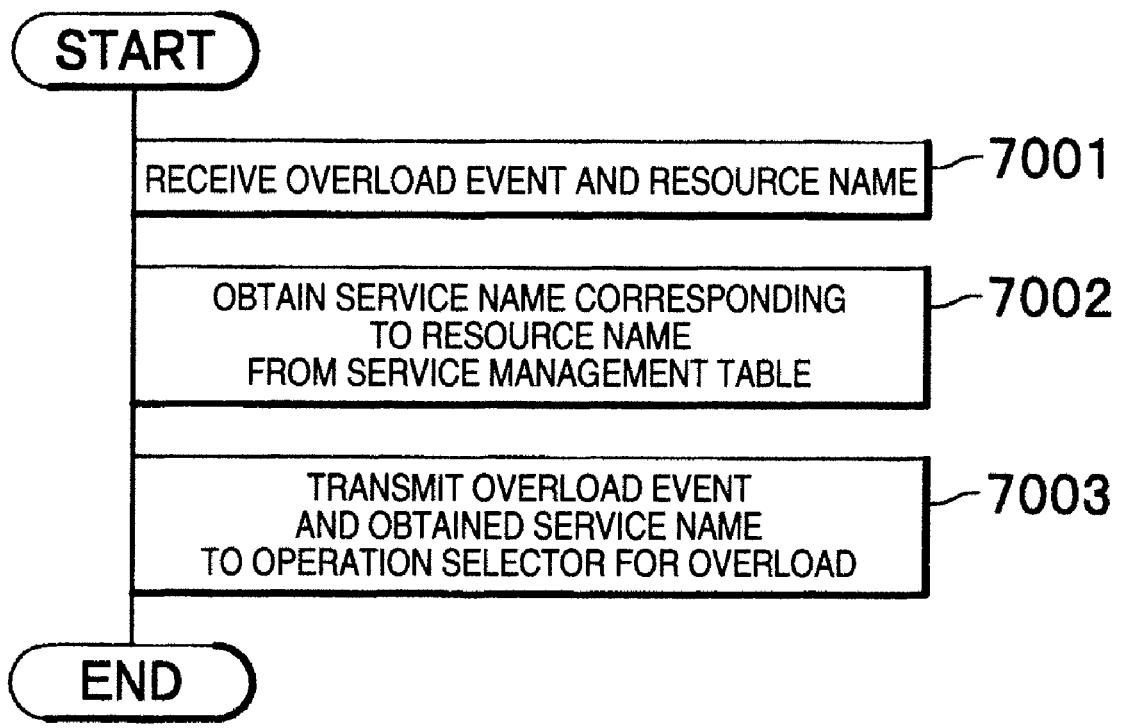
FIG. 12 is a PAD diagram showing a procedure to transmit a notification of an overload event to the business process management computer.

Here, FIG. 12 is an example of a PAD diagram showing a flow of a process in which the unit for message routing between business processes and services 1310 of the computer for message routing between business processes and services 1300 routes the transmission of the overload event and a resource name of overload from the resource management computer 1400 to the operation selector for overload 1212 of the business process management computer 1200.

First, at step 7001, the overload event and the resource name with its load increased are received from the resource monitor 1411 of the resource management computer 1400.

Next, at step 7002, all of the service names corresponding to the resource name received at the step 7001 are obtained from the service management table 1321 of the computer for message routing between business processes and services 1300.

Then, at step 7003, the overload event and the service names obtained at the step 7002 are transmitted to the operation selector for overload 1212 of the business process management computer 1200.

By the above procedure, the resource name which the resource management computer 1400 transmits is communicated to the business process management computer 1200 after being converted to the service name which operates on said resource by that the computer for message routing between business processes and services 1400 routes the message.

(Overload Operation Phase)

Next, it will be explained about the "overload operation" phase. FIG. 13 is an example of a PAD diagram showing a flow of the process in which after the computer for message routing between business processes and services 1300 transmitted the overload event and the service name corresponding to the same to the business process management computer 1200, until the operation selector for overload 1212 of the business process management computer 1200 decides the operation of the same.

First, at step 8001, the operation selector for overload 1212 of the business process management computer 1200 receives the overload event and the service name which is to be the object which the unit for message routing between business processes and services 1310 of the computer for message routing between business processes and services 1300 transmitted at the step 7003 of the PAD diagram shown in FIG. 12.

Next, at step 8002, the operation selector for overload 1212 obtains all of the records which match the service name received at the step 8001 from the service call step management table 1221 (see FIG. 9).

Then, at step 8003, if there is not a record of which value of the "step condition" 5500 is the "bottleneck" among the records obtained at the step 8002 (No at the step 8003), the process is terminated as it is, and if there are one or more records (Yes at the step 8003), the process proceeds to step 8004.

Here, if there is no record which is the "bottleneck", it is supposed to execute no operation because even if any operation is executed for this overload event, the improvement of the throughput of the business process is not expected.

Next, at step 8004, if there is not a record of which value of the "step condition" 5500 is the "flowing data amount limitation available" among the records obtained at the step 8002 (No at the step 8004), the process proceeds to step 8005, and if there are one or more records (Yes at the step 8004), the process proceeds to step 8006.

Here, if there is no record which is the "flowing data amount limitation available", at the step 8005, the operation selector for overload 1212 transmits a resource addition request which is information to request the addition of the resource and the service name received at the step 8001 to the computer for message routing between business processes and services 1300.

At the step 8005, after the operation selector for overload 1212 transmitted the resource addition request and the service name to the computer for message routing between business processes and services 1300, the unit for message routing between business processes and services 1310 of the computer for message routing between business processes and services 1300 which received the same extracts the "resource name" corresponding to the received "service name" based on the service management table 1321 and stores it in the primary storage device 2630 and transmits the resource addition request and the resource name which is to be its object to the resource composition manager 1412 of the resource management computer 1400. Then, the resource composition manager 1412 which received the above-mentioned resource addition request and resource name adds a resource to the service execution computer (1510~1540) corresponding to the received resource name. Here, about a procedure to add a resource, a well known technique can be applied.

On the other hand, at the step 8006 to which the process proceeds when there are one or more records which are the "flowing data amount limitation available" at the step 8004, the operation selector for overload 1212 obtains the values of the "business process name" 5100 and the "calling service name" 5200 of the records of which value of the "step condition" 5500 is the "flowing data amount limitation available" among the records obtained at the step 8002. Then, it obtains the lowest value of the value of the "throughput" 5400 from a group of records of which values of the "business process name" 5100 are the same.

Then, at step 8007, the operation selector for overload 1212 transmits a flowing data amount limitation request which requests the limitation of the flowing data amount of the request amount, the "business process name" obtained at the step 8006, the "calling service name", and the lowest value of the "throughput" to the each step's flowing data amount controller 1112 of the business process execution computer 1100.

The each step's flowing data amount controller 1112 receives the "flowing data amount limitation request", the "business process name", the "calling service name", and the "throughput" which the operation selector for overload 1212 transmitted at the step 8007, and limits the amount of the request which the service call step of which "business process name" and "calling service name" match transmits to the received value of the throughput. As a limitation method of the flowing data amount, for example, it can be considered a method which if the request amount transmitted within one minute is the same as the lowest value of the throughput received at the step 8007, manages so that the request is not transmitted for said one minute and waits until said one minute has passed.

Here, the method to limit the throughput is not limited to this and it can be changed in various ways.

By the above procedure, when the overload event has occurred, if the service call step which is to be the object is not the bottleneck in the business process, as no operation is executed for said overload event, it is possible to prevent the execution of the useless operation which cannot improve the throughput of said business process.

Also, when the overload event has occurred, if the service call step which is to be the object is the bottleneck, it is determined whether there is one of which flowing data amount can be limited or not among other service call steps which the service execution computer (1510~1540) which provides said service call step executes, and as the resource is added only when there is no other service call step of which flowing data amount can be limited, the addition of the resource can be limited to the minimum.

(Operation After Flowing Data Amount Limitation)

It can be considered a case where even if the flowing data amount limitation is executed the resource is insufficient. In such a case, the insufficiency of the resource can be solved by executing the resource addition after the flowing data amount limitation. More specifically, it can be realized by that when the flowing data amount limitation is executed, it is stored that it has been executed in the service call step management table 1221, and when the operation selector for overload 1212 newly receives the overload event of the service, if the flowing data amount limitation has already been executed for said service, it decides to add the resource. This operation to execute the resource addition when the resource insufficiency has not been solved after the flowing data amount limitation execution will be called hereinafter a "secondary operation after the flowing data amount limitation".

The secondary operation after the flowing data amount limitation can be realized by making the service call step management table 1221 and the operation selector for overload 1212 have the configurations which will be described later.

FIG. 26 is a configuration of the service call step management table 1221 and an example of information to be stored when realizing the secondary operation after the flowing data amount limitation. In FIG. 26, compared to the service call step management table 1221 of FIG. 9, an in flowing data amount limitation flag 26100 is added. The in flowing data amount limitation flag 26100 indicates whether each service call step is in the flowing data amount limitation or not by ON/OFF and the values of the in flowing data amount limitation flag 26100 of the service call steps which call the same service become the same. As the value of the in flowing data amount limitation flag 26100 is updated by the operation selector for overload 1212, the details of the update means of the value will be shown in the explanation of the operation selector for overload 1212 which will be described later.

FIG. 27 is a PAD diagram showing a process which the operation selector for overload 1212 executes on realizing the secondary operation after the flowing data amount limitation in addition to the overload operation process shown in FIG. 13.

At step 27001, the operation selector for overload 1212 of the business process management computer 1200 receives the overload event and the service name which is to be the object which the unit for message routing between business processes and services 1310 of the computer for message routing between business processes and services 1300 transmitted at the step 7003 of the PAD diagram shown in FIG. 12.

Next, at step 27002, the operation selector for overload 1212 obtains all of the records which match the service name received at the step 27001 from the service call step management table 1221 (see FIG. 26).

Then, at step 27003, if there is not a record of which value of the "step condition" 5500 is the "bottleneck" among the records obtained at the step 27002 (No at the step 27003), the process is terminated as it is, and if there are one or more records (Yes at the step 27003), the process proceeds to step 27004.

At the step 27004, if there are one or more records of which value of the step condition 5500 is the "flowing data amount limitation available" and of which value of the in flowing data amount limitation flag 26100 is "off" among the records obtained at the step 27002 (Yes at the step 27004), namely there are one or more service call steps of which flowing data amount can be limited, the process proceeds to step 27009, and if there is no such a record (No at the step 27004), the process proceeds to step 27005. At the step 27005, the resource addition request and the service name received at the step 27001 are transmitted to the computer for message routing between business processes and services 1300. At step 27006, it is determined whether the values of the in flowing data amount limitation flags 26100 of all of the records obtained at the step 27002 are "ON" or not, and if they are "ON" (Yes at the step 27006), the process proceeds to step 27007, and if they are not "ON" (No at the step 27006), the process is terminated as it is. At the step 27007, a flowing data amount limitation remove request and the service name obtained at the step 27001 are transmitted to the each step's flowing data amount controller 1112. At step 27008, the values of the in flowing data amount limitation flags 26100 of all of the records obtained at the step 27002 are updated to "OFF".

At the step 27009, the operation selector for overload 1212 obtains the values of the "business process name" 5100 and the "calling service name" 5200 of the record of which value of the "step condition" 5500 is the "flowing data amount limitation available" and the value of the in flowing data amount limitation flag 26100 is "OFF" among the records obtained at the step 27002. Then, it obtains the lowest value of the value of the "throughput" 5400 from a group of records of which value of the "business process name" 5100 are the same. At step 27010, a flowing data amount limitation request and the business process name, the calling service name, and the lowest value of the throughput which are obtained at the step 27009 are transmitted to the each step's flowing data amount controller 1112. At step 27011, the values of the in flowing data amount limitation flags 26100 of all of the records obtained at the step 27002 are updated to "ON".

When the resource insufficiency is not solved even if the flowing data amount limitation is executed by the above processing, the resource addition is executed.

Operation Example 1

An operation of the business process management computer 1200 of this embodiment will be explained below showing as an example more specific service and business process.

Figure 14:
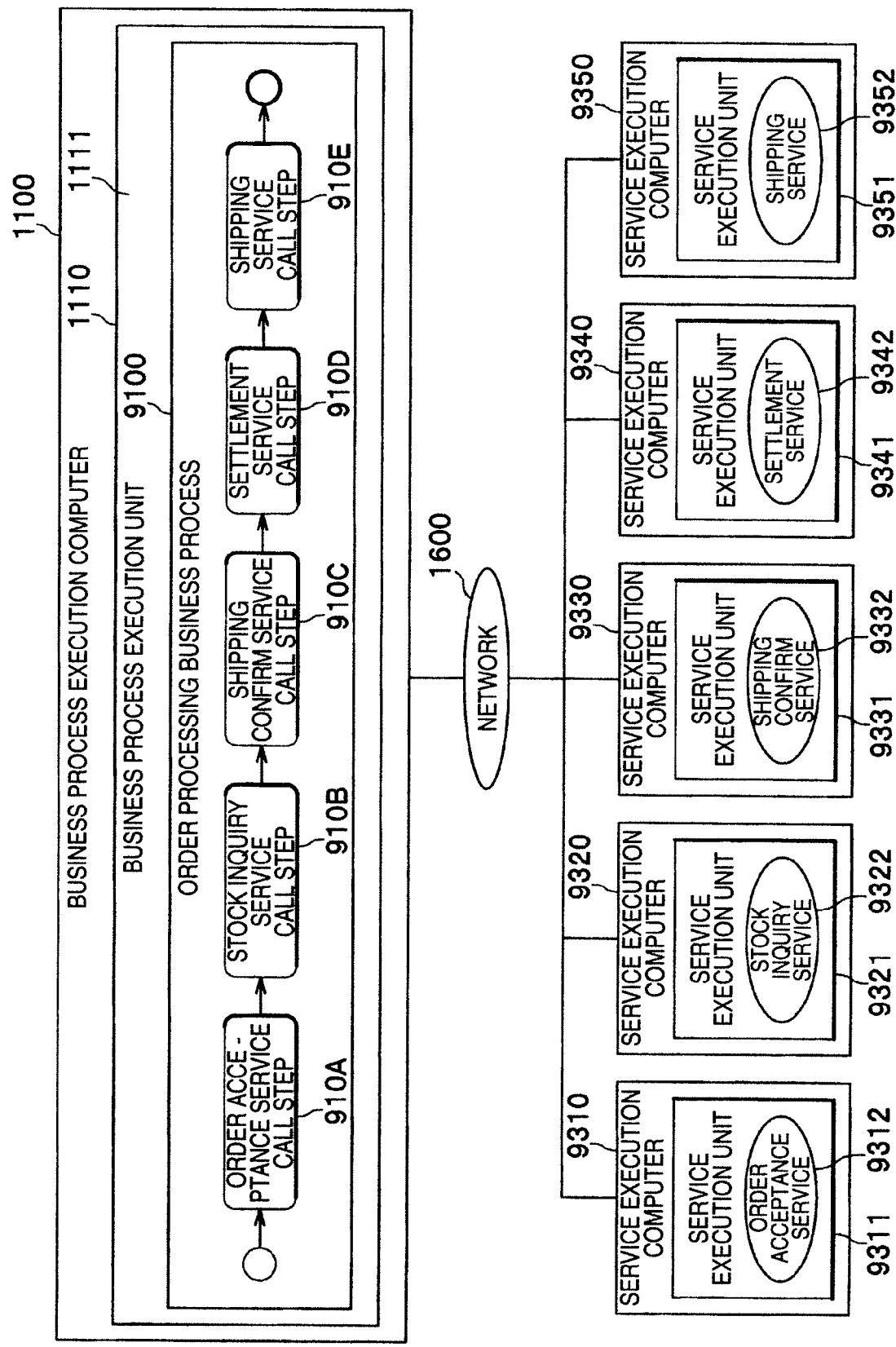
FIG. 14 is a diagram showing in simplification a configuration of the business process execution computer and a group of service execution computers.

First, it will be explained an example to prevent a case where the resource addition executed on the service execution computers (1510~1540) does not contribute to improve the throughput of the business process by the business process management computer 1200 of this embodiment. FIG. 14 is a diagram showing in simplification configurations of the business process execution computer and a group of service execution computers which will be used in this embodiment. Here, in FIG. 14, some devices are omitted and the configurations of the omitted devices are the same as the configurations of the devices shown in FIG. 1.

In service execution computers (9310~9350) of this embodiment, an order acceptance service 9312, a stock inquiry service 9322, a shipping confirm service 9332, a settlement service 9342, and a shipping service 9352 operate in each service execution unit (9311~9351) respectively. An order processing business process 9100 which executes a series of order processing combining a group of these services is executed at the business process execution unit 1110. In such a configuration, a condition in which the CPU load of the service execution computer 9320 which executes the stock inquiry service 9322 and the CPU load of the service execution computer 9340 which executes the settlement service 9342 have become overload and a settlement service call step 910D of the order processing business process 9100 has become the bottleneck of the order processing business process 9100 for some reason is assumed.

Here, FIGS. 15~17 are diagrams showing the resource management table 1421 of the resource management computer 1400, the service management table 1321 of the computer for message routing between business processes and services 1300, and the service call step management table 1221 of the business process management computer 1200 in such a condition.

Values "server 1", "server 2", "server 3", "server 4", and "server 5" stored in a "resource name" 3100 of the resource management table 1421 shown in FIG. 15 are the values specifying the service execution computers (9310~9350) respectively. In FIG. 15, it is shown that the values of the "load condition" 3300 of a record 1501 of which value of the "resource name" 3100 is "server 2" and a record 1502 of which value of the "resource name" 3100 is "server 4" are both the "overload".

Here, first, an aspect in which the overload event of the "server 2" is transmitted and until the operation is decided will be explained. In the resource management table 1421 shown in FIG. 15, as the value of the "load condition" 3300 of the record 1501 corresponding to the "server 2" is the "overload", the resource management unit 1410 of the resource management computer 1400 transmits the overload event and the resource name "server 2" to the unit for message routing between business processes and services 1310 of the computer for message routing between business processes and services 1300.

The unit for message routing between business processes and services 1310 which received said event refers to the service management table 1321 shown in FIG. 16 and finds a record 1601 of which value of an "resource name" 4200 is the "server 2" and obtains a value "stock inquiry" of a "service name" 4100 of said record.

The unit for message routing between business processes and services 1310 transmits the overload event and the above-mentioned obtained value "stock inquiry" of the "service name" 4100 to the business process management unit 1210 of the business process management computer 1200.

The business process management unit 1210 which received the overload event and the service name finds a record 1701 of which value of the "calling service name" 5200 is the "stock inquiry" from the service call step management table 1221 shown in FIG. 17 and obtains a value "flowing data amount limitation available" of the "step condition" 5500 of said record. These processing in which the business process management unit 1210 received the event and processing in which it obtained the value of "flowing data amount limitation available" from the service call step management table 1221 correspond to the step 8001 and the step 8002 of the flow to decide the operation for the overload event shown in FIG. 13.

At step 8003, it is determined whether there is a "bottleneck" in the values of the "step condition" 5500 obtained from the service call step management table 1221 (see FIG. 17) or not and the process branches according to the determination result. In this case, as the obtained value is the "flowing data amount limitation available", the process flow to decide the operation for said overload event is terminated. Namely, it means that no operation is executed for the overload event which has occurred at the server 2, namely the service execution computer 1520.

This is a determination that in the order processing business process 9100, as the bottleneck of the process is not the stock inquiry service 9322 which operates on the server 2, even if the resource addition is executed, the throughput of the order processing business process 9100 is not expected to be improved. Thereby, it is possible to prevent the unnecessary resource addition and to save the resources.

Next, it will be explained a procedure in which the overload event of the server 4 is transmitted and until the operation is decided. As it has been described above, as the value of the load condition 3300 of the record 1502 corresponding to the server 4 is the "overload" from FIG. 15, the overload event and the resource name "server 4" are transmitted from the resource management unit 1410 to the unit for message routing between business processes and services 1310.

The unit for message routing between business processes and services 1310 which received the overload event and the resource name "server 4" refers to the service management table 1321 shown in FIG. 16 and finds a record 1602 of which value of the resource name 4200 is the "server 4" and obtains a value "settlement" of the service name 4100 of said record.

The unit for message routing between business processes and services 1310 transmits the overload event and the above-mentioned obtained value "settlement" of the "service name" 4100 to the business process management unit 1210.

The business process management unit 1210 which received the overload event and the service name finds a record 1702 of which value of the "calling service name" 5200 is the "settlement" from the service call step management table 1221 shown in FIG. 17 and obtains a value "bottleneck" of the "step condition" 5500 of said record.

These processing in which the event is received and processing in which the value of the "bottleneck" is obtained from the service call step management table 1221 correspond to the step 8001 and the step 8002 of the flow to decide the operation for the overload event of FIG. 13. Hereinafter please see FIG. 13.

Next, at the step 8003, it is determined whether there is a "bottleneck" in the value of the "step condition" 5500 obtained from the service call step management table 1221 or not, and the process branches according to the determination result. In this case, as the obtained value is the "bottleneck", the process proceeds to step 8004.

Then at the step 8004, it is determined whether there is a "flowing data amount limitation available" in the value obtained from the service call step management table 1221 or not, and the process branches according to the determination result. In this case, as the obtained value is the "bottleneck", the process proceeds to step 8005.

Next, at the step 8005, the operation selector for overload 1212 transmits the resource addition request and the service name "settlement" to the computer for message routing between business processes and services 1300, and in response to this, the computer for message routing between business processes and services 1300 executes the resource addition to the server 4 (the service execution computer 9340). This means that it is determined that in the order processing business process 9100 the bottleneck of the process is the settlement service 9342 which operates on the server 4 and that the improvement of the throughput of the order processing business process 9100 is expected by executing the resource addition.

As it has been described above, it can have an effect that the unnecessary addition of the resource can be prevented by determining whether the resource addition should be executed or not using the service call step management table 1221 which indicates the condition of each service call step of the business process.

Operation Example 2

Figure 18:
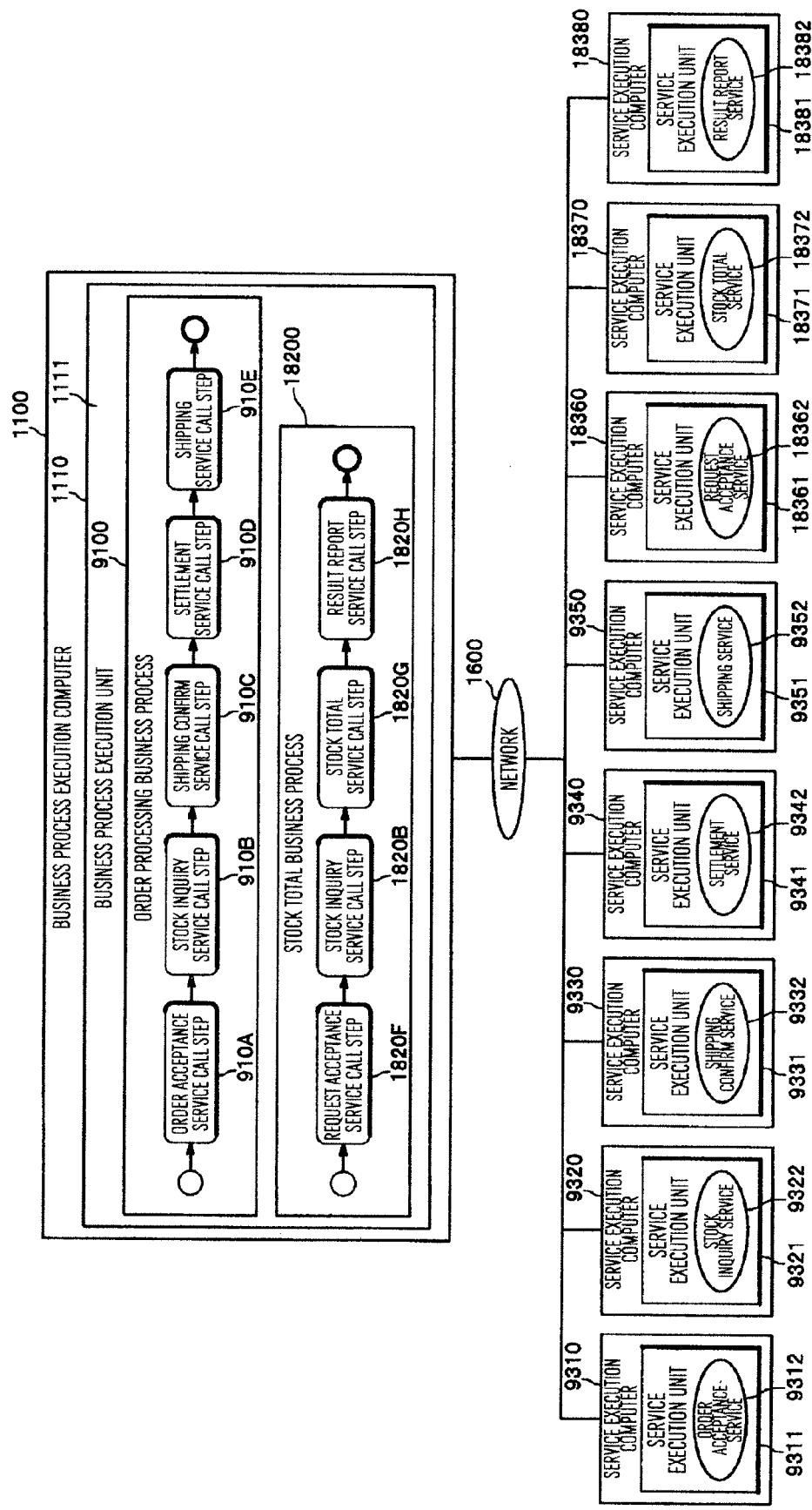
FIG. 18 is a diagram showing in simplification a configuration of the business process execution computer and a group of service execution computers.

Next, it will be explained that when there is a service call step which does not contribute to the improvement of the throughput of the business process as the above-mentioned case, it is possible to prevent said service call step from affecting the throughput of other business processes by consuming the resource more than necessary using a specific example. FIG. 18 is a diagram showing in simplification configurations of the business process execution computer and a group of service execution computers which will be used in the explanation of this embodiment. In FIG. 18, service execution computers (18360~18390) which execute a request acceptance service 18362, a stock total service 18372, and a result report service 18382 are added to the configuration of FIG. 14 shown in the above-mentioned first embodiment. Further, a stock total business process 18200 which executes a series of stock total processing combining the request acceptance service 18362, the stock total service 18372, the result report service 18382, and the stock inquiry service 9322 which is shared with the order processing business process 9100 is added as a business process executed at the business process execution computer 1100.

Here, in FIG. 18 some devices are omitted and the configurations of the omitted devices are the same as the configurations of the devices in FIG. 1.

In the configuration shown in FIG. 18, a condition in which the CPU load of the service execution computer 9320 which executes the stock inquiry service 9322 is overload and a settlement service call step 910D of the order processing business process 9100 and a stock inquiry service call step 1820B of the stock total business process 18200 have become the bottleneck of each of the business process is assumed. Here, as the settlement service call step 910D of the order processing business process 9100 has become the bottleneck, the stock inquiry service call step 910B which is executed in the earlier order than said service call step is supposed to be consuming the resource processing a request amount more than necessary (namely, it is in the flowing data amount limitation available condition) as long as the settlement service call step 910D is in the bottleneck condition. This affects and results in that the stock inquiry service call step 1820B of the stock total business process 18200 has become the bottleneck of said business process.

Here, FIGS. 19 and 20 are diagrams showing examples of the service management table 1321 of the computer for message routing between business processes and services 1300 and the service call step management table 1221 of the business process management computer 1200 in the condition like this.

Also, for the resource management table 1421 of the resource management computer 1400 in this embodiment the resource management table 1421 shown in FIG. 4 is supposed to be used. The values stored in the "resource name" 3100 of the resource management table 1421 in FIG. 4, "server 1", "server 2", "server 3", "server 4", "server 5", "server 6", "server 7", "server 8" are the values which specify the service execution computers (9310~9350, 18360~18380), and they correspond to the service execution computers (9310~9350, 18360~18380) respectively.

Further, in FIG. 4, the value of the "load condition" 3300 of the record 3001 of which value of the resource name 3100 is "server 2" indicates that it is the "overload". It will be explained a process in which the overload event of the server 2 is transmitted until its operation is decided assuming a condition like this.

As the value of the "load condition" 3300 of the record 3001 corresponding to the "server 2" of the resource management table 1421 shown in FIG. 4 is the "overload", the resource management unit 1410 of the resource management computer 1400 transmits the overload event and the resource name "server 2" to the unit for message routing between business processes and services 1310 of the computer for message routing between business processes and services 1300.

The unit for message routing between business processes and services 1310 which received the overload event and the resource name refers to the service management table 1321 shown in FIG. 19 and finds a record 1901 of which value of the "resource name" 4200 is the "server 2" and obtains a value "stock inquiry" of the "service name" 4100 of said record. Then, the unit for message routing between business processes and services 1310 transmits the overload event and the above-mentioned obtained service name "stock inquiry" to the business process management unit 1210 of the business process management computer 1200.

The business process management unit 1210 which received the overload event and the service name finds a record 2001 and a record 2002 of which values of the "calling service name" 5200 are the "stock inquiry" from the service call step management table 1221 shown in FIG. 20 and obtains two values of the "flowing data amount limitation available" and the "bottleneck" of the value of the "step condition" 5500 of said records.

These processing in which the event is received and processing in which the values of the "flowing data amount limitation available" and the "bottleneck" are obtained from the service call step management table 1221 correspond to the step 8001 and the step 8002 of the flow to decide the operation for the overload event of FIG. 13. Hereinafter, please see FIG. 13.

Next, at the step 8003, it is determined whether there is a "bottleneck" in the value of the "step condition" 5500 obtained from the service call step management table 1221 or not and the process branches according to the determination result. In this case, as the obtained values of the "step condition" 5500 are the "flowing data amount limitation available" and the "bottleneck" and as there is a "bottleneck", the process proceeds to the step 8004.

Next, at the step 8004, it is determined whether there is a "flowing data amount limitation available" in the above-mentioned values of the "step condition" 5500 obtained from the service call step management table 1221 or not, and the process branches according to the determination result. In this case, as the obtained values of the "step condition" 5500 are the "flowing data amount limitation available" and the "bottleneck" and as there is a "flowing data amount limitation available", the process proceeds to the step 8006.

Next, at the step 8006 and the step 8007, the throughput of the stock inquiry service call step 910B of the order processing business process 9100 which is in the "flowing data amount limitation available" condition is limited to the same throughput as the settlement service call step 2004 which is in the bottleneck condition of said business process. Namely, when the load of the server in which the service which a plurality of business processes share operate has become overload, the throughput of the business process which uses the resource of the server more than necessary is limited to the value with which the throughput of the entire said business process is not affected.

Thereby, it has an effect that in the environment in which the same service call step is shared by a plurality of business processes, when said service call step has become the bottleneck in one business process, the throughput of the entire said one business process can be improved without decreasing the throughput of entire other business processes by decreasing the throughput in other business processes which are determined to be flowing data amount adjustable.

Second Embodiment

It will be explained about a second embodiment to which the present invention is applied centering in the different points from the first embodiment below. It is greatly different in that in the above-mentioned first embodiment, when the overload of the service execution computer is detected (the occurrence of the overload event), there are three kinds of the operation of the business process management computer 1200 which are "do nothing", "execute the flowing data amount limitation", and "add a resource", but in this embodiment, there are two kinds of them which are "do nothing" and "add a resource".

In the configuration of the business process management computer 1200 of this embodiment, compared to the configuration of the business process management computer 1200 of the first embodiment, the information stored in the service call step management table 1221, and the processing in the service call step manager 1211 and the operation selector for overload 1212 are different. Here, about the other device configuration, as it is the same as the entire configuration of the first embodiment shown in FIG. 1, its explanation will be omitted.

Here, an example of information stored in the service call step management table 1221 in this embodiment is shown in FIG. 21. As shown in FIG. 21, values stored in a "step condition" 10500 are two kinds which are "normal" as in records denoted by reference signs 10001, 10002, 10003, and 10005, and "bottleneck" as in a record denoted by a reference sign 10004.

It will be explained about an operation of the business process management computer 1200 of this embodiment blow.

(Execution Information Monitoring and Management Phase)

First, it will be explained about the "execution information monitoring and management" phase of this embodiment. Here, FIG. 22 is an example of a PAD diagram showing an example of processing in which the service call step manager 1211 of the business process management computer 1200 periodically updates the condition of the business process.

Figure 22:
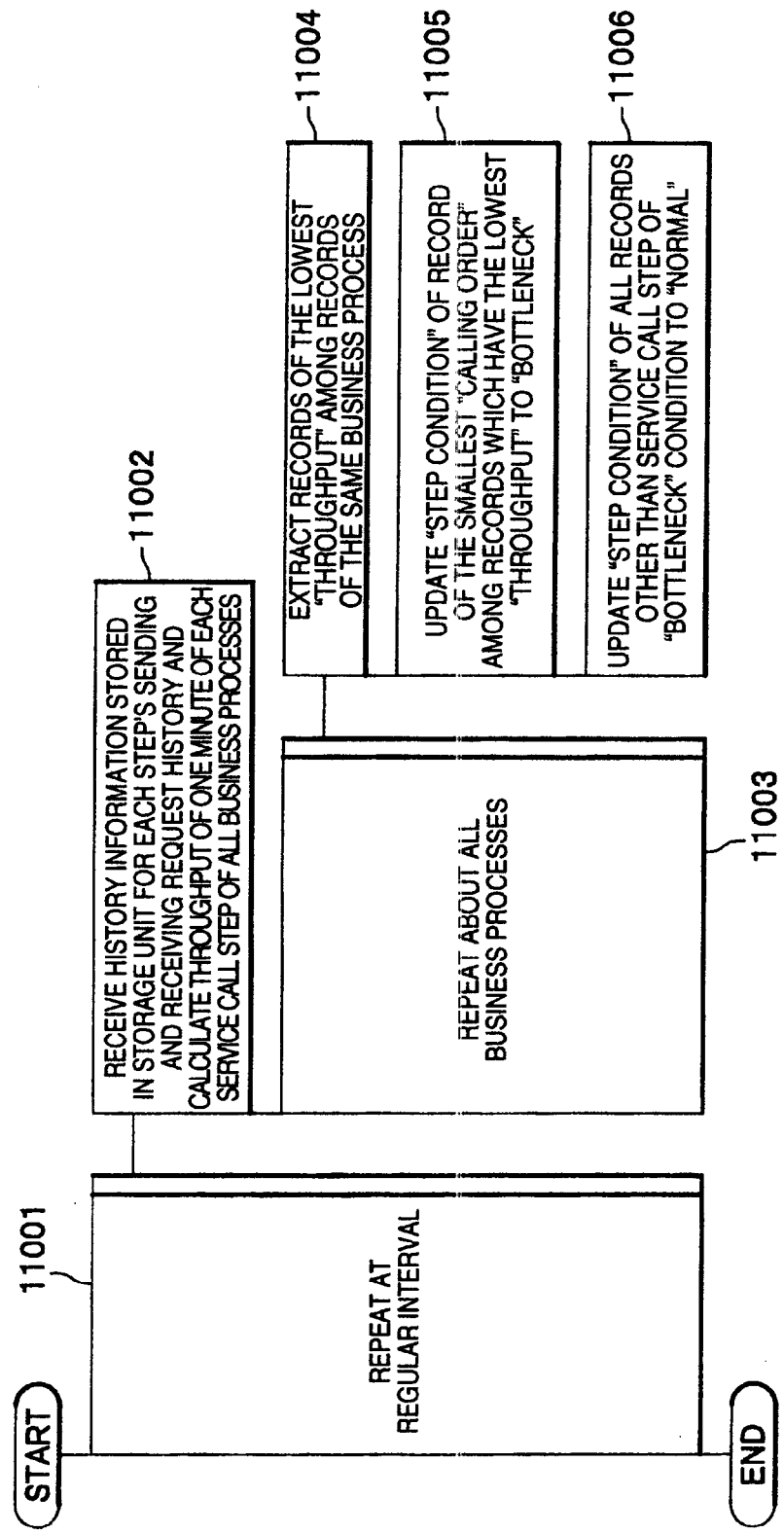
FIG. 22 is a PAD diagram showing a procedure in which a service call step manager of the business process management computer periodically updates the condition of the business process.

In the PAD diagram shown in FIG. 22, as the processing from step 11001 to step 11005 are the same as the processing from the step 6001 to the step 6005 in the PAD diagram of the first embodiment shown in FIG. 10, their explanations will be omitted.

Next, at step 11006, the service call step manager 1211 of the business process management computer 1200 extracts records other than the record of which value of a "step condition" 10500 has been updated to the "bottleneck" at the step 11005 from the service call step management table 1221 (see FIG. 21), and updates the values of the "step condition" 10500 of these extracted records to the "normal" and the process is terminated.

Here, for example, if the value of the "step condition" 10500 of the record denoted by the reference sign 10004 of the service call step management table 1221 shown in FIG. 21 is updated to the "bottleneck" at the step 11005, at the step 11006, the values of the "step condition" 10500 of the records denoted by the reference signs 10001, 10002, 10003, and 10005 are updated to the "normal".

Here, it is also possible to display a display screen which has the same configuration as the business process execution condition display screen 6001 shown in FIG. 11 of the first embodiment on the display 2340 after the termination of the process in the PAD diagram shown in FIG. 22. In this case, the information displayed in the display screen is created based on the information of the service call step management table 1221 shown in FIG. 21.

(Notification of Overload Event)

In this embodiment, about the process in which the unit for message routing between business processes and services 1310 of the computer for message routing between business processes and services 1300 routes the event which is transmitted from the resource management computer 1400 to the operation selector for overload 1212 of the business process management computer 1200, as it is the same as the process in the first embodiment shown in FIG. 12, its explanation will be omitted.

(Overload Operation Phase)

Next, it will be explained about the "overload operation" phase in this embodiment. Here, FIG. 23 is an example of a PAD diagram showing a flow of processing in which after the resource monitor 1411 of the resource management computer 1400 transmitted the overload event, until the operation is decided by the operation selector for overload 1212 of the business process management computer 1200 in this embodiment.

Figure 23:
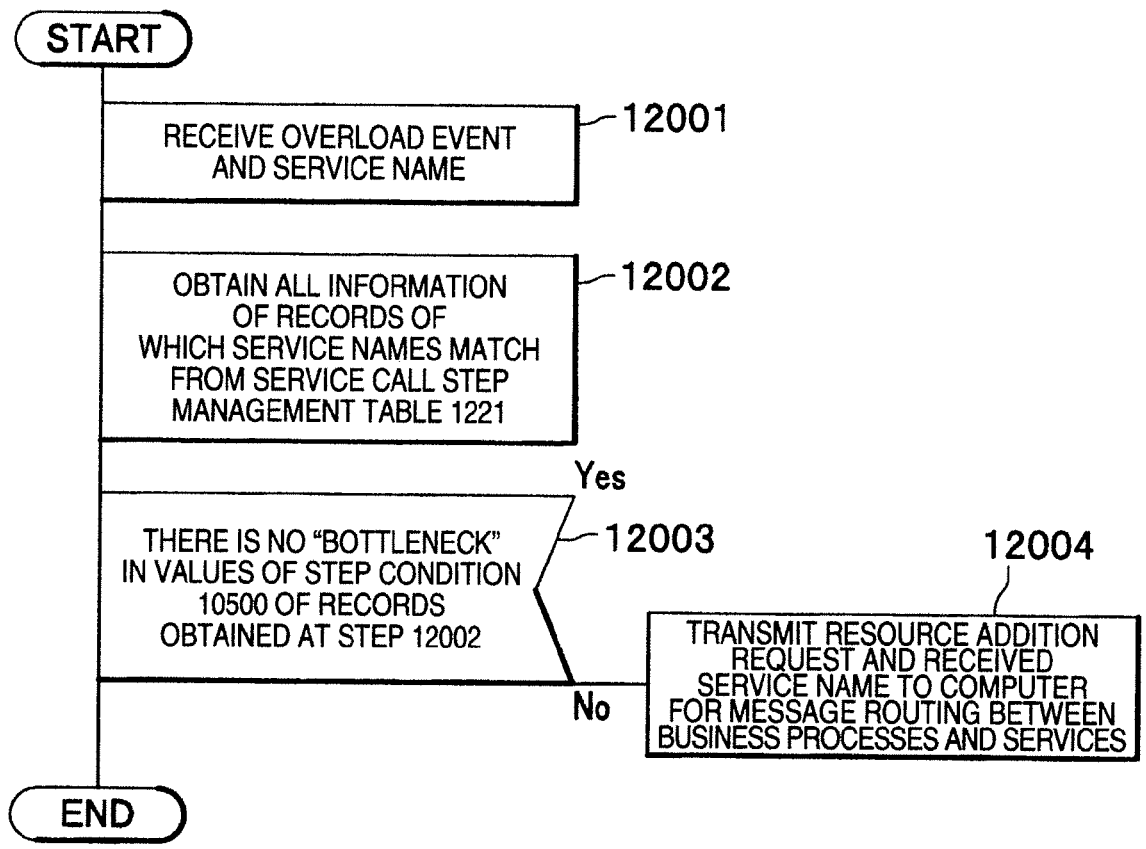
FIG. 23 is a PAD diagram showing a procedure in which an operation for the overload event is decided by an operation selector for overload of the business process management computer.
Figure 24:
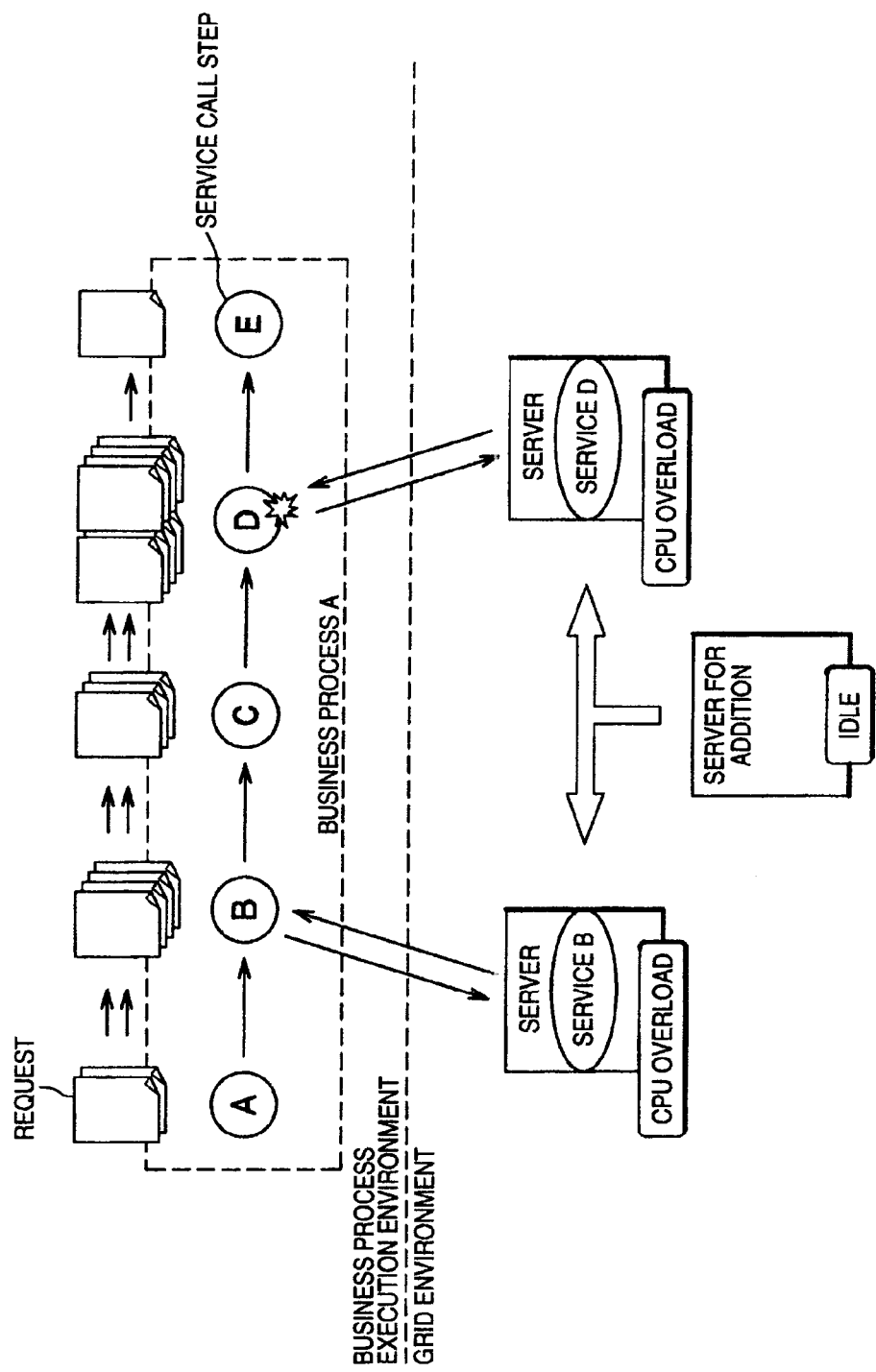
FIG. 24 is a diagram explaining a condition in which the allocation of an idle server for addition is to be executed as addition of resource.
Figure 25:
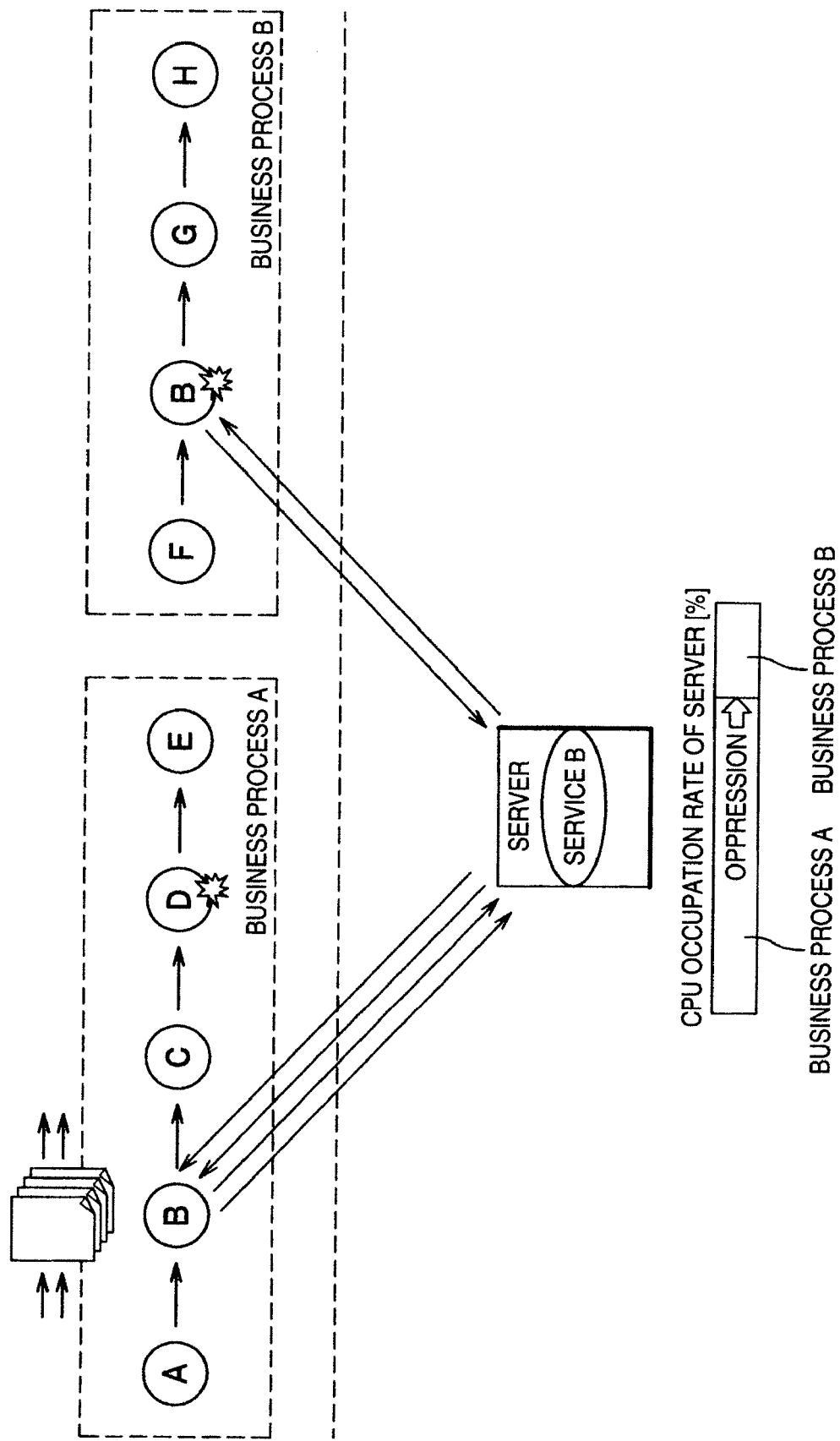
FIG. 25 is a diagram explaining a condition in which a business process B is executed and a business process A and the business process B share a service B in the condition shown in FIG. 24.

In the PAD diagram shown in FIG. 23, as step 12001 and step 12002 are the same as the step 8001 and the step 8002 which are the processing in the operation selector for overload 1212 of the first embodiment shown in FIG. 13, their explanations will be omitted.

Next, at step 12003, if there is not a record of which value of the "step condition" 10500 is the "bottleneck" among the records of the service call step management table 1221 obtained at the step 12002 (Yes at the step 12003), the process is terminated, and if there is one (No at the step 12003), the process proceeds to step 12004. Then, at the step 12004, a resource addition request and the service name obtained at the step 12001 are transmitted to the computer for message routing between business processes and services 1300 and the process is terminated.

The computer for message routing between business processes and services 1300 which received the resource addition request and the service name transmitted at the step 12004 converts the service name to a corresponding resource name and transmits the resource addition request and the resource name to the resource composition manager 1412. The resource composition manager 1412 which received the above-mentioned resource addition request and resource name adds a resource to the service execution computer (1510–1540) corresponding to the received resource name.

Here, for example, assuming that a record denoted by the reference sign 10004 of the service call step management table 1221 shown in FIG. 21 is obtained at the step 12002, at the step 12003, as the value of the "step condition" 10500 of this record is the "bottleneck", the process proceeds to the step 12004 and the resource addition request and the service name "D" of this record are supposed to be transmitted.

According to the business process management computer 1200 according to this embodiment which has been explained above, in the business process, it is possible to add a resource only to the resource which has become the bottleneck for the enhancement of the throughput, and it is possible to prevent the useless addition of the resource. Also, compared to the first embodiment, as the processing to adjust the throughput does not exist in the service execution computer, the present invention can be applied to more general environment.

The invention claimed is:

1. A business process management system comprising:
a plurality of application servers, each of which comprises a service execution unit which provides a designated service;
a process execution computer comprising a process execution unit which executes a process including service call steps, each of which calls and uses said service execution unit in one of said application servers;
a process management computer which determines a processing condition of said service call step when said process is executed;
a resource management computer which manages allocation and addition of computer resources of said application servers; and
said application servers, said process execution computer, said process management computer, and said resource management computer being connected with each other via a network,
wherein said process management computer comprises:
a storage part which stores a service call step management table which holds at least an execution order of said service steps in each process and a throughput which is an execution number of each service call step in each process,
a service call step manager which:
extracts the throughput and the execution order regarding said service call steps in each process from said service call step management table,
classifies said service call steps in each process into a bottleneck condition, a flowing data amount limitation available condition, or a normal condition according to said extracted throughput and execution order, the bottleneck condition being set to a service call step having an earlier execution order within service call steps having a lowest throughput, the flowing data amount limitation available condition being set to a service call step having an execution order earlier than the service call step in the bottleneck condition, and the normal condition being set to a service call step having the execution order later than the service call step in the bottleneck condition, and
stores the classified conditions in said service call step management table; and
an operation selector for overload which, on obtaining information which indicates that load of said application server has been increased via said network:
extracts the conditions of the service call steps in each process which calls the service execution unit on the load-increased application server from said service call step management table,
determines whether the extracted conditions include the bottleneck condition or not, and if the extracted conditions include the bottleneck condition, determines whether the extracted conditions in other steps of the process executed in the load-increased application server includes a flowing data amount limitation available condition,
if the extracted conditions do not include the flowing data amount limitation available condition, outputs a request of adding computer resource of said load-increased application server to said resource management computer, and
if the extracted conditions include the flowing data amount limitation available condition, outputs a request for limiting the throughput of the service call step of the other process to said process execution computer.

2. A business process management system of claim 1, wherein:
said process management computer, when the other process includes a service call step in the flowing data amount limitation available condition, extracts the throughput of the service call step in the bottleneck condition in the same process as the service call step in the flowing data amount limitation available condition from said service call step management table, and
outputs a request for limiting the throughput of the service call step in the flowing data amount limitation available condition to said extracted throughput of the service call step in the bottleneck condition to said process execution computer.

3. A business process management system of claim 1, wherein:
said process management computer, when the other process includes a service call step in the flowing data amount limitation available conditions outputs a request for limiting the throughput of the service call step in the flowing data amount limitation available condition to a predetermined value to said process execution computer.

4. A business process management system of claim 1, wherein:
said application servers are one or more virtual servers which are executed within one physical server.

5. A business process management method in a business process management system which includes a plurality of application servers each of which comprises a service execution unit which provides a designated service, a process execution computer comprising a process execution unit which executes a process including service call steps, each of which calls and uses said service execution unit in one of said application servers, a process management computer which determines a processing condition of said service call step when said process is executed, a resource management computer which manages allocation and addition of computer resources of said application servers; and wherein said application servers, said process execution computer, said process management computer, and said resource management computer are connected with each other via a network,
wherein said process management computer performs the steps of:
storing an execution order of said service call steps in each process and a throughput which an execution number of each said service call step per said in each process in a service call step management storage unit;
extracting the throughput and the execution order regarding said service call steps in each process from said service call step management storage unit;
classifying said service call steps in each process into a bottleneck condition, a flowing amount limitation available condition, or a normal condition according to said extracted throughput and execution order, the bottleneck condition being set to a service call step having an earlier execution order within service call steps having a lowest throughput, the flowing data amount limitation available condition being set to a service call step having an execution order earlier than the service call step in the bottleneck condition, and the normal condition being set to a service call step having the execution order later than the service call step in the bottleneck condition; and storing the classified conditions in said service call step management table; and on obtaining information which indicates that load of said application server has been increased via said network, extracting the conditions of the service call steps in each process which calls the service execution unit of the load-increased application server from said service call step management storage unit determining whether the extracted condition in other steps in the process executed in the load-increased application server includes a flowing data amount limitation available condition, if the extracted conditions do not include the flowing data amount limitation available condition, outputting a request of adding computer resource of said load-increased application server to said resource management computer, and if the extracted conditions include the flowing data amount limitation available condition, outputting a request for limiting the throughput of the service call step of the other process to said process execution computer.

6. A business process management method in a business process management system which includes a plurality of application servers each of which comprises a service execution unit which provides a designated service, a process execution computer comprising a process execution unit which executes a process including service call steps, each of which calls and uses said service execution unit in one of said application servers, a process management computer which determines a processing condition of said service call step when said process is executed, a resource management computer which manages allocation and addition of computer resources of said application servers; and wherein said application servers, said process execution computer, said process management computer, and said resource management computer are connected with each other via a network, wherein said process management computer performs the steps of:

storing an execution order of said service call steps in each process and a throughput which an execution number of each said service call step per said in each process in a service call step management storage unit;

extracting the throughput and the execution order regarding said service call steps in each process from said service call step management storage unit;

classifying said service call steps in each process into a bottleneck condition, a flowing amount limitation available condition, or a normal condition according to said extracted throughput and execution order, the bottleneck condition being set to a service call step having an earlier execution order within service call steps having a lowest throughput, the flowing data amount limitation available condition being set to a service call step having an execution order earlier than the service call step in the bottleneck condition, and the normal condition being set to a service call step having the execution order later than the service call step in the bottleneck condition; and storing the classified conditions in said service call step management table; and on obtaining information which indicates that load of said application server has been increased via said network, extracting the conditions of the service call steps in each process which calls the service execution unit of the load-increased application server from said service call step management storage unit, determining whether the extracted condition in other process executed in the load-increased application server includes a flowing data amount limitation available condition, if the extracted conditions do not include the flowing data amount limitation available condition, outputting a request of adding computer resource of said load-increased application server to said resource management computer, and if the extracted conditions include the flowing data amount limitation available condition, outputting a request for limiting the throughput of the service call step of the other process to said process execution computer.

7. A business process management method in said business process management system of claim 5, wherein:

said process management computer performs the steps of:

when the other process includes a service call step in the flowing data amount limitation available conditions, outputting a request for limiting the throughput of the service call step in the flowing data amount limitation available condition to a predetermined value to said process execution computer.

8. A business process management method in said business process management system of claim 5, wherein:

said application server comprises one or more virtual servers which are executed within one server.

9. A process management computer used in a business process management system which includes a plurality of application servers each of which comprises a service execution unit which provides a designated service, a process execution computer comprising a process execution unit which executes a process including service call steps, each of which calls and uses said service execution unit in one of said application servers, a process management computer which determines a processing condition of said service call step when said process is executed, a resource management computer which manages allocation and addition of computer resources of said application servers; and wherein said application servers, said process execution computer, said process management computer, and said resource management computer being connected with each other via a network, said process management computer comprising:

a storage part which stores a service call step management table which holds at least an execution order of said service call steps in each process and a throughput which is an execution number of each service call step in each process;

a service call step manager which extracts the throughput and the execution order regarding said service call steps in each process from said service call step management table, classifies said service call steps in each process into a bottleneck condition, a flowing data amount limitation available condition, or a normal condition according to said extracted throughput and execution order, the bottleneck condition being set to a service call step having an earlier execution order within service call steps having a lowest throughput, the flowing data amount limitation available condition being set to a service call step having an execution order earlier than the service call step in the bottleneck condition, and the normal condition being set to a service call step having the execution order later than the service call step in the bottleneck condition, and stores the classified conditions in said service call step management table; and an operation selector for overload which on obtaining information which indicates that load of said application server has been increased via said network, extracts the conditions of the service call steps in each process which calls the service execution unit on the load-increased application server from said service call step management table, and determines whether the extracted conditions includes the bottleneck condition or not, and if the extracted conditions include the bottleneck condition, determines whether the extracted conditions in other steps in the process executed in the load-increased application server include a flowing data amount limitation available condition, if the extracted conditions do not include the flowing data amount limitation available condition, outputs a request of adding computer resource of said load-increased application server to said resource management computer, and if the extracted conditions include the flowing data amount limitation available condition, outputs a request for limiting the throughput of the service call step of the other process to said process execution computer.

10. A process management computer of claim 9,
when the other process includes a service call step in the flowing data amount limitation available condition, extracts the throughput of the service call step in the bottleneck condition in the same process as the service call step in the flowing data amount limitation available condition from said service call step management table, and outputs a request for limiting the throughput of the service call step in the flowing data amount limitation available condition to said extracted throughput of the service call step in the bottleneck condition to said process execution computer.

11. A process management computer of claim 9,
when the other process includes a service call step in the flowing data amount limitation available conditions outputs a request for limiting the throughput of the service call step in the flowing data amount limitation available condition to a predetermined value to said process execution computer.

12. A process management computer of claim 9, wherein said application server are one or more virtual servers which are executed within one server.

13. A non-transitory computer readable medium storing a program of a process management computer used for a business process management system which comprises a plurality of application servers each of which includes a service execution unit which provides a designated service, a process execution computer which includes a process execution unit which executes a process including service call steps, each of which calls and uses said service execution unit in one of said application servers, said process management computer which determines a processing condition of said service call step when said process is executed, a resource management computer which manages allocation and addition of computer resources of said application servers; and wherein said application servers, said process execution computer, said process management computer, and said resource management computer being connected with each other via a network, wherein said program causing a computer of said process management computer to execute the following processes:

a process to store an execution order of said service call in each process and a throughput which is an execution number of each service call step in each process in a service call step management storage unit;

a process to extract the throughput and the execution order regarding said service call step steps in each process from said service call step management storage unit;

a process to classify said service call steps in each process into a bottleneck condition, a flowing data amount limitation available condition, or a normal condition according to said extracted throughput and execution order, the bottleneck condition being set to a service call step having an earlier execution order within service call steps having a lowest throughput, the flowing data amount limitation available condition being set to a service call step having an execution order earlier than the service call step in the bottleneck condition, and the normal condition being set to a service call step having the execution order later than the service call step in the bottleneck condition;

a process to store the classified conditions in said service call step management table;

a process to obtain information which indicates that load of said application server has been increased via said network;

a process to extract the conditions of the service call steps in each process which calls the service execution unit of the load-increased application server from said service call step management storage unit, a process to determine whether the extracted conditions include the bottleneck condition or not, a process, a process to determine whether the extracted conditions in other steps in the process executed in the load-increased application include a flowing data amount limitation available condition;

a process to output, if the extracted conditions do not include the flowing data amount limitation available condition, a request of adding computer resource of said load-increased application server to said resource management computer; and a process to output, if the extracted conditions include the flowing data amount limitation available condition, a request for limiting the throughput of the service call step of the other process to said process execution computer.

14. A non-transitory computer readable medium storing a program of process management computer of claim 13, wherein said program makes said computer of said process management computer execute;

a process, when the other process includes a service call step in the flowing data amount limitation available condition, to extract the throughput of the service call step in the bottleneck condition in the same process as the service call step in the flowing amount limitation available condition from said service call step management table, and a process to output a request for limiting the throughput of the service call step in the flowing data amount limitation available condition to said extracted throughput of the service call step in the bottleneck condition to said process execution computer.

15. A non-transitory computer readable medium storing a program of process management computer of claim 13, wherein said program makes said computer of said process management computer execute;

a process, when the other process includes a service call step in the flowing data amount limitation available conditions, outputting a request for limiting the throughput of the service call step in the flowing data amount limitation available condition to a predetermined value to said process execution computer.

16. A non-transitory computer readable medium storing a program of process management computer of claim 13, wherein said application server comprises one or more virtual servers which are executed within one server.

* * * * *